US012039834B2

(12) United States Patent
Hamman et al.

(10) Patent No.: US 12,039,834 B2
(45) Date of Patent: Jul. 16, 2024

(54) SYSTEM AND METHOD FOR GENERATION AND VALIDATION OF MULTIGAME PRINTED TICKETS USING MULTIDIMENSIONAL BARCODES

(71) Applicant: SCA Promotions, Dallas, TX (US)

(72) Inventors: Robert D. Hamman, Dallas, TX (US); Jay B. Ross, Delran, NJ (US)

(73) Assignee: SCA PROMOTIONS, Dallas, TX (US)

( * ) Notice: Subject to any disclaimer, the term of this patent is extended or adjusted under 35 U.S.C. 154(b) by 0 days.

(21) Appl. No.: 17/292,897

(22) PCT Filed: Nov. 4, 2020

(86) PCT No.: PCT/US2020/058819
§ 371 (c)(1),
(2) Date: May 11, 2021

(87) PCT Pub. No.: WO2022/098347
PCT Pub. Date: May 12, 2022

(65) Prior Publication Data

US 2023/0267803 A1 Aug. 24, 2023

(51) Int. Cl.
*G07F 17/32* (2006.01)

(52) U.S. Cl.
CPC ........ *G07F 17/3241* (2013.01); *G07F 17/329* (2013.01)

(58) Field of Classification Search
CPC ............... G07F 17/3241; G07F 17/329; G07F 17/3225; G07F 17/326
See application file for complete search history.

(56) References Cited

U.S. PATENT DOCUMENTS

| | | | | |
|---|---|---|---|---|
| 7,611,065 | B2 | 11/2009 | Behm et al. | |
| 8,740,096 | B2 | 6/2014 | Young | |
| 9,839,836 | B2 | 12/2017 | Connolly et al. | |
| 2007/0105608 | A1* | 5/2007 | Dransfield | G07F 17/32 463/13 |
| 2009/0253481 | A1 | 10/2009 | Honour | |
| 2017/0053473 | A1* | 2/2017 | Colvin | A63F 3/0665 |
| 2020/0294362 | A1* | 9/2020 | Hamman | G07F 17/329 |

FOREIGN PATENT DOCUMENTS

WO WO-2019222758 A1 * 11/2019 ............ G06Q 20/28

OTHER PUBLICATIONS

International Search Report and Written Opinion for corresponding PCT Application No. PCT/US2020/058819, dated Feb. 5, 2021.

* cited by examiner

*Primary Examiner* — Peter J Iannuzzi
(74) *Attorney, Agent, or Firm* — MEAGHER EMANUEL LAKS GOLDBERG & LIAO, LLP

(57) ABSTRACT

According to various embodiments, a system for implementing a predetermined multigame is disclosed. The system includes a plurality of tickets each having one or more multidimensional barcodes representing information about a plurality of predetermined game outcomes and information about game security and game data integrity. The one or more multidimensional barcodes are configured to be optically scanned to have a result displayed by a computing device to allow a player to determine whether the information about a plurality of predetermined game outcomes comprises a winning outcome.

25 Claims, 24 Drawing Sheets

250

| | |
|---|---|
| Number of Poker Hands | 10,800,000 |
| Number of Pools | 100 |
| Pool size | 108,000 |
| # of hands / QR Code | 200 |
| Total QR Codes | 54,000 |
| Cost per hand | $0.25 |
| Cost per QR Code | $50.00 |

251

| Winning Poker Hand | Prize | Total Available | Prize Per Pool | pproximate Od | Token # |
|---|---|---|---|---|---|
| Royal Flush | 500.00 | 10 | - | 1:1,080,000 | 9 |
| Straight Flush | 250.00 | 10 | - | 1:1,080,000 | 8 |
| Four of a Kind | 75.00 | 100 | 1 | 1 :108,000 | 7 |
| Full House | 40.00 | 9000 | 90 | 1:1, 200 | 6 |
| Flush | 20.00 | 18000 | 180 | 0.458333333 | 5 |
| Straight | 5.00 | 108000 | 1080 | 0.111111111 | 4 |
| Three of a kind | 1.00 | 216000 | 2160 | 1:50 | 3 |
| Two Pair | 0.50 | 756000 | 7560 | 1:14 | 2 |
| One Pair | 0.25 | 2160000 | 21600 | 1:05 | 1 |
| No Winner | - | 7532880 | 75328 | 01:01.5 | 0 |

Figure 6

800

Lottery Department
Quick Poker Lottery Game AB008439

1. Name of the game:
   The name of the game is Quick Poker. The game number is AB008439.

2. Price of the ticket:
   The price of a Dog Days of Summer instant lottery game ticket is $50.00.

3. Play symbols:
   Each Quick Poker game ticket will contain 200 poker hand outcomes. Each outcome will be represented by 5 playing cards selected from a standard deck of 52 playing cards. The standard deck of 52 playing cards is defined as having one of each card in the ranking order of 2, 3, 4, 5, 6, 7, 8, 9, 10, Jack, Queen, King, and Ace in each of the four suits of Hearts, Spades, Diamonds, and Clubs. The playing cards will be displayed in the play area.

4. Prizes:
   The prizes that can be won in this game are: $500, $250, $75, $40, $20, $5, $1, $0.50, and $0.25.

5. Approximate number of poker hands created for the game:
   Approximately 10,800,000 poker hands will be created for the Quick Poker game.

6. Approximate number of tickets printed for the game:
   Approximately 54,000 tickets each containing 200 poker hands will be printed for the Quick Poker game.

7. Determination of ticket prize winnings:
   The ticket prize winnings ("Overall Value") will be determined by the summation of the prize winnings of each individual poker hand ("Game Prize") contained in the Quick Poker game code.

8. Determination of game prizes:
   (a) Poker hands in which the combination of the 5 displayed playing cards create the "Royal Flush" combination (10-Jack-Queen-King-Ace, all in the same suit) shall have game prize value $500.00 added to the current overall value of the quick poker ticket.

Figure 17(a)

800

(b) Poker hands in which the combination of the 5 displayed playing cards create the "Straight Flush" combination (5 consecutive cards, all in the same suit) shall have game prize value $250.00 added to the current overall value of the quick poker ticket.

(c) Poker hands in which the combination of the 5 displayed playing cards create the "4 of a Kind" combination (4 cards of the same rank) shall have game prize value $75.00 added to the current overall value of the quick poker ticket.

(d) Poker hands in which the combination of the 5 displayed playing cards create the "Full House" combination (3 of a Kind and a Pair) shall have game prize value $40.00 added to the current overall value of the quick poker ticket.

(e) Poker hands in which the combination of the 5 displayed playing cards create the "Flush" combination (All 5 cards are of the same suit, but do not have to be consecutive) shall have game prize value $20.00 added to the current overall value of the quick poker ticket.

(f) Poker hands in which the combination of the 5 displayed playing cards create the "Straight" combination (5 consecutive cards from any suit) shall have game prize value $5.00 added to the current overall value of the quick poker ticket.

(g) Poker hands in which the combination of the 5 displayed playing cards create the "3 of a Kind" combination (3 cards of the same rank) shall have game prize value $1.00 added to the current overall value of the quick poker ticket.

(h) Poker hands in which the combination of the 5 displayed playing cards create the "2 Pair" combination (2 pairs of cards of the same rank) shall have game prize value $0.50 added to the current overall value of the quick poker ticket.

(i) Poker hands in which the combination of the 5 displayed playing cards create the "One Pair" combination (A pair of cards of the same rank) shall have game prize value $025 added to the current overall value of the quick poker ticket.

Figure 17(b)

800

9. Number and description of prizes and approximate odds:

| Winning Poker Hand | Prize | Total Available | Approximate Odds |
|---|---|---|---|
| **Royal Flush** 10-Jack-Queen-King-Ace, all in the same suit | $500.00 | 10 | 1:1,080,000 |
| **Straight Flush** 5 consecutive cards, all in the same suit | $250.00 | 10 | 1:1,080,000 |
| **Four of a Kind** 4 cards of the same rank | $75.00 | 100 | 1:108,000 |
| **Full House** 3 of a Kind and a Pair | $40.00 | 9,000 | 1:1,200 |
| **Flush** All 5 cards are of the same suit, but do not have to be consecutive | $20.00 | 18,000 | 1:600 |
| **Straight** 5 consecutive cards from any suit | $5.00 | 108,000 | 1:100 |
| **Three of a Kind** 3 cards of the same rank | $1.00 | 216,000 | 1:50 |
| **Two Pair** 2 pairs of cards of the same rank | $0.50 | 756,000 | 1:14 |
| **One Pair** A pair of cards of the same rank | $0.25 | 2,160,000 | 1:5 |
| **No Winner** 5 cards of different, non-consecutive ranks and 2 or more suits | $0.00 | 7,532,800 | 1:1.5 |

Prizes, including top prizes, are subject to availability at the time of purchase.

10. Retailer incentive awards:
    The Lottery may conduct a separate Retailer Incentive Program for retailers who sell Dog Days of Summer instant lottery game tickets.

Figure 17(c)

800

11. Retailer bonus:
The Lottery may offer a retailer bonus in connection with the sale of instant lottery game tickets. If a retailer bonus is offered, a Lottery retailer shall be eligible for a bonus as described in this section. Lottery retailers who sell a winning ticket that entitles the ticket holder to a prize, either payable in a single installment or having a guaranteed minimum payout, of at least $100,000 and not exceeding $500,000 shall be paid a bonus of $500. Lottery retailers who sell a winning ticket that entitles the ticket holder to a prize, either payable in a single installment or having a guaranteed minimum payout, of at least $500,001 and not exceeding $1,000,000 shall be paid a bonus of $5,000. A Lottery retailer is entitled only to the largest bonus for which they qualify for on a winning ticket. A bonus will be initiated for payment after the instant ticket is claimed and validated. A bonus will not be awarded to a Lottery retailer that sells a non-winning Lottery instant ticket used to enter a Lottery second-chance drawing or promotion that is subsequently selected to win a prize.

12. Unclaimed prize money:
For a period of 1 year from the announced close of Dog Days of Summer, prize money from winning Dog Days of Summer instant lottery game tickets will be retained by the Secretary for payment to the persons entitled thereto. If no claim is made within 1 year of the announced close of the Dog Days of Summer instant lottery game, the right of a ticket holder to claim the prize represented by the ticket, if any, will expire and the prize money will be paid into the State Lottery Fund and used for purposes provided for by statute.

13. Governing law:
In purchasing a ticket, the customer agrees to comply with and abide by the State Lottery Law and the provisions contained in this notice.

14. Termination of the game:
The Lottery may announce a termination date, after which no further tickets from this game may be sold. The announcement will be disseminated through media used to advertise or promote Dog Days of Summer or through normal communications methods.

Figure 17(d)

SYSTEM AND METHOD FOR GENERATION AND VALIDATION OF MULTIGAME PRINTED TICKETS USING MULTIDIMENSIONAL BARCODES

FIELD OF THE INVENTION

The present invention relates generally to games of chance and, more particularly, to a gaming system and method for providing tickets that encode predetermined multigame game results stored in a multidimensional barcode.

BACKGROUND OF THE INVENTION

The gaming and lottery industries have enjoyed a steady increase in popularity over time. This increase has produced a competitive marketplace for instant win type games of chance.

FIG. 1 depicts an example of a prior art game card 1 offered by the Texas lottery. The game is based on the game of poker. The technology used for this prior art game card is a "scratch off technique". The game player removes a top layer of deposited material to reveal the card images underneath the opaque scratch off material. The area denoted by 2 is the five card predetermined poker hands. There are ten "games" on a card. The area defined by 4 is the five cards denoted as the "dealer hand". According to the rules of the game of poker, the player must reveal a hand "combination" that is ranked higher than the dealer hand in order to win any of the ten "games". The hidden area 3 indicates the dollar amount won by the player. The area defined by 5 is the game instructions. The area defined by 6 identifies a reference number for the scratch off card. However, this approach can lead to limited game play, requires a specialized printing process, additional expenses to produce a scratch off ticket, and uses what some would consider antiquated "paper" technology.

As such, there is a need for a predetermined multigame that can contain a higher density of game outcomes on an inexpensive, easy to produce game ticket where the game play is transposed into an electronic form for a more interactive experience, especially with instant win type games. It can be easy for users to download software applications onto smart devices, effectively allowing them to be a personal gaming device. With the abundance of "smart" communication devices, such as the Apple or Android smart devices, it can be possible to read an instant win type printed ticket using the smart device's camera and the internet to lookup or download information associated with the instant game on the smart device.

A key element when matching a smart device to an instant win ticket is the ability to represent the predetermined outcomes of a game with limited printing space on the ticket. Error control and verifiability are also desirable attributes of the information placed on the printed ticket. As such, an optically encoded read-only information approach is desirable for encoding the information printed on a low cost to manufacture ticket.

SUMMARY OF THE INVENTION

According to various embodiments, a system for implementing a predetermined multigame is disclosed. The system includes a plurality of tickets each having one or more multidimensional barcodes representing information about a plurality of predetermined game outcomes and information about game security and game data integrity. The one or more multidimensional barcodes are configured to be optically scanned to have a result displayed by a computing device to allow a player to determine whether the information about a plurality of predetermined game outcomes comprises a winning outcome.

According to various embodiments, a method for implementing a predetermined multigame is disclosed. Them method includes generating a total plurality of predetermined game outcomes for the predetermined multigame via a game specification file of a computer system and shuffling the total plurality of game outcomes for the predetermined multigame via a random number generator of the computer system. The method further includes causing each of a plurality of predetermined multigame tickets to be produced with one or more multidimensional barcodes representing information about a plurality of predetermined game outcomes of the total plurality of predetermined game outcomes and information about game security identification and game data integrity. The one or more multidimensional barcodes are configured to be optically scanned to have a result displayed by a computing device to allow a player to determine whether the information about a plurality of predetermined game outcomes comprises a winning outcome.

According to various embodiments, a non-transitory computer-readable medium having stored thereon a computer program for execution by a processor configured to perform a method for implementing a predetermined multigame is disclosed. The method includes generating a total plurality of predetermined game outcomes for the predetermined multigame via a game specification file of a computer system and shuffling the total plurality of game outcomes for the predetermined multigame via a random number generator of the computer system. The method further includes causing each of a plurality of predetermined multigame tickets to be produced with one or more multidimensional barcodes representing information about a plurality of predetermined game outcomes of the total plurality of predetermined game outcomes and information about game security identification and game data integrity. The one or more multidimensional barcodes are configured to be optically scanned to have a result displayed by a computing device to allow a player to determine whether the information about a plurality of predetermined game outcomes comprises a winning outcome.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 6 depicts a sample of predetermined multigame parameter values according to an embodiment of the present invention;

FIG. 17(*a*) depicts an example of game rules according to an embodiment of the present invention;

FIG. 17(*b*) depicts an example of game rules according to an embodiment of the present invention;

FIG. 17(*c*) depicts an example of game rules according to an embodiment of the present invention;

FIG. 17(*d*) depicts an example of game rules according to an embodiment of the present invention;

DETAILED DESCRIPTION OF THE INVENTION

Generally disclosed herein are embodiments for a gaming system and method for generating and playing predetermined multigame tickets (i.e. a ticket containing multiple games or multiple rounds of a single type of game). The tickets encode the predetermined game outcomes in a multidimensional barcode. The player scans the barcode on their smart device and plays the encoded multigames using an internet downloaded software application program.

Embodiments of the present invention preserve the advantages of the prior art approaches for the production and playing of multigame tickets while providing for a denser storage capability of predetermined outcomes using standard ticket printing techniques, as well as providing for a security system and method for ticket verification.

Figure 4:
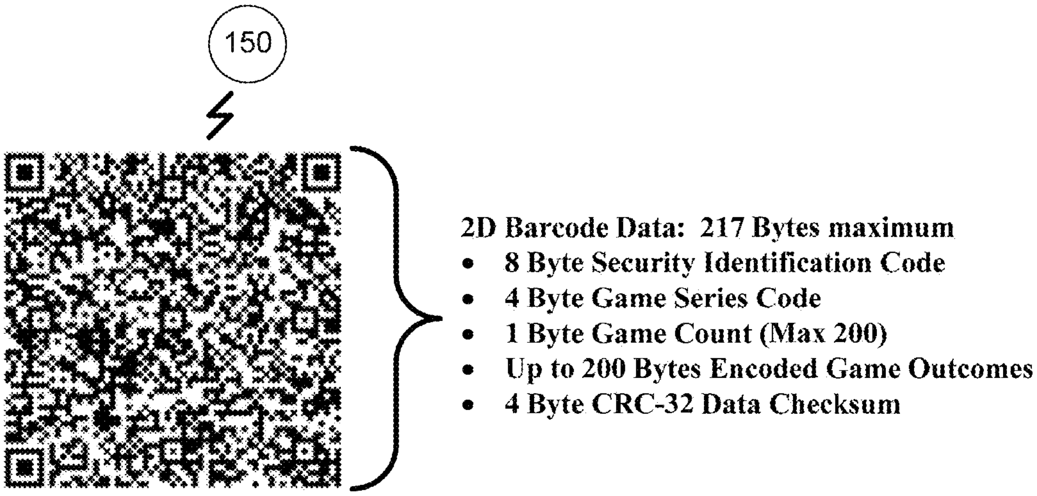
FIG. 4 depicts an example of a multidimensional barcode data structure according to an embodiment of the present invention.

The denser storage capability is provided by generating predetermined game outcomes and encoding them into a multidimensional barcode. A nonlimiting example of a multidimensional barcode is a quick response (QR) code, as seen in FIG. 4.

The predetermined outcomes are generated using outcome results from specification tables and a random number generator. The predetermined outcomes are shuffled and batched into subgroups. The size of a subgroup is defined in the predefined game rules. A security code is generated for each batch of predetermined outcomes. The batch sequence number is encoded into the security code and stored in a secure database for the eventual ticket verification process.

Important technical advantages of certain embodiments of the present invention include generating batched game predetermined outcomes, generating security codes, and encoding the outcomes and security codes into a multidimensional printed code suitable for optical scanning.

Additional technical advantages of embodiments of the present invention will be readily apparent to one skilled in the art from the following figures, description, and claims. Moreover, while specific advantages have been enumerated above, various embodiments may include all, some, or none of the enumerated advantages. The game of Poker is used as a nonlimiting example of how the method and system perform. However, any predetermined multigame can be used in conjunction with this system and method, such as Black Jack, Craps, and slot machines, as nonlimiting examples.

Figure 1:
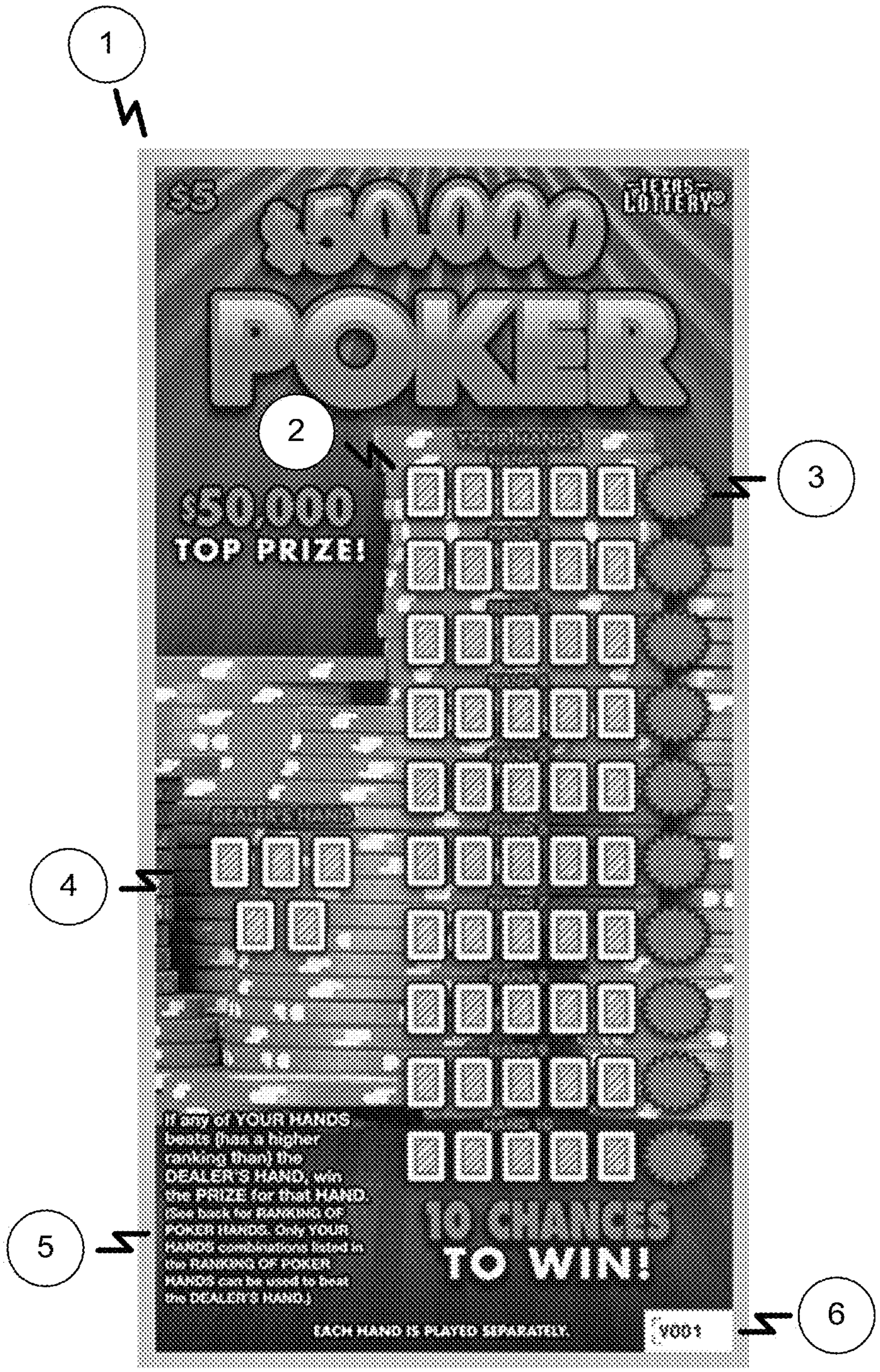
Figure 1 (Prior Art)
FIG. 1 depicts a diagram of a prior art game.
Figure 2:
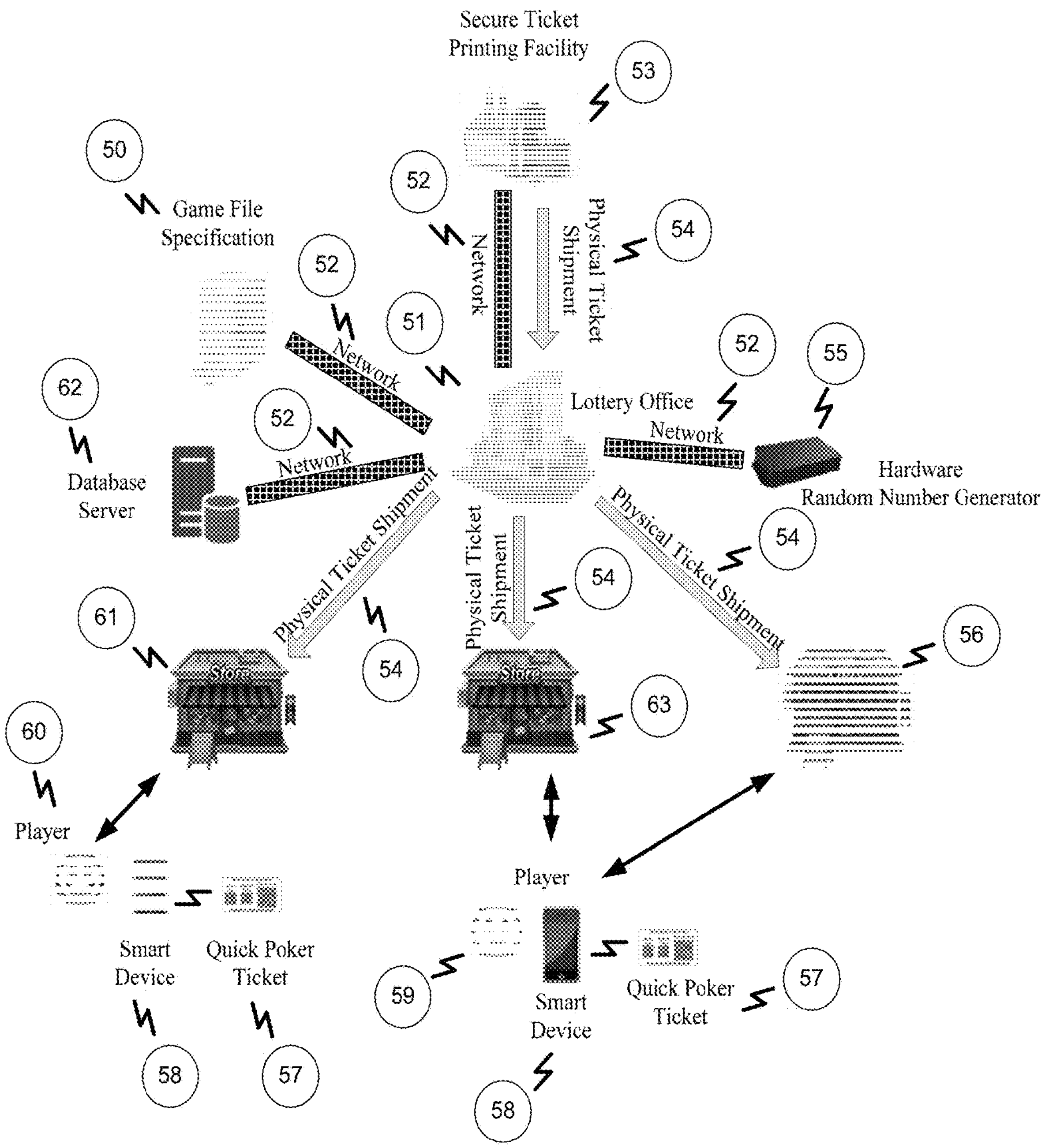
FIG. 2 depicts an overview diagram of a predetermined multigame ticket using a multidimensional barcode system according to an embodiment of the present invention.

FIG. 2 is a pictorial overview of a multigame system using multidimensional barcodes, such as but not limited to a 2-dimensional barcode. While FIG. 2 and subsequent figures may refer to the multigame system as "lottery" based, the reference to "lottery" is intended to be a nonlimiting example of a multigame system or method. A game specification 50 and the game rules (not shown) define the characteristics of the multigame ticket. The game specification 50 may be developed at a secure site external to the main multigame office 51. Communication of the game specification may occur using a secure data network 52. The main office 51 uses the game specifications 50 and game rules along with a hardware random number generator 55 to create and shuffle the game outcomes. The main office 51 generates batches of the game outcomes as defined in the game specification file 50 and stores the batch information in a database server 62. The main office 51 coordinates with the secure ticket printing facility 53 to print the multigame ticket 57 with the batch information as stored in the database server 62. The main office 51 may utilize a courier, a delivery service, or other means to physically distribute 54 the printed multigame game tickets 57 to authorized retailers 56, 61, 63 (such as lottery retailers). Players 59, 60 can purchase the multigame game ticket 57 from any of the authorized retailers 56, 61, 63. Using the camera on their smart device 58, the player is able to display all the available game outcomes and determine the winning amount associated with the multigame game ticket 57.

Figure 3:
FIG. 3 depicts an example of a predetermined multigame ticket using a multidimensional barcode system according to an embodiment of the present invention.

FIG. 3 is an example of a ticket 100 for the predetermined multigame using a 2-dimensional (2D) barcode system. The ticket 100 contains three 2D barcodes 101, 102, 103. The first 2D barcode 103 may contain a uniform resource locator (URL) link which allows the player to download the application on their smart device, allowing the player to display the outcomes associated with the ticket 100. The second barcode 102 may contain a URL link which will direct the player to the specific page on the multigame organization's website which describe the game specifications and game rules. The third 2D barcode 101 contains a nonlimiting 217 bytes of data. This data contains various game and ticket security identification information (i.e. game security and data integrity information) as well as encoded game outcomes. The amount of data varies with game complexity variations.

FIG. 4 shows an example of a 2D barcode 150 that could be used in the multigame system. The 2D barcode 150 contains 217 bytes of data, including 8 bytes for the security identification code, 4 bytes for identifying the game series code, and 1 byte identifying the number of encoded game outcomes stored in the 2D barcode 150. The next 200 bytes stored in the 2D barcode 150 are the encoded game outcomes. The final 4 bytes of data are used as verification data to ensure the information contained in the 2D barcode 150 is valid.

Figure 5:
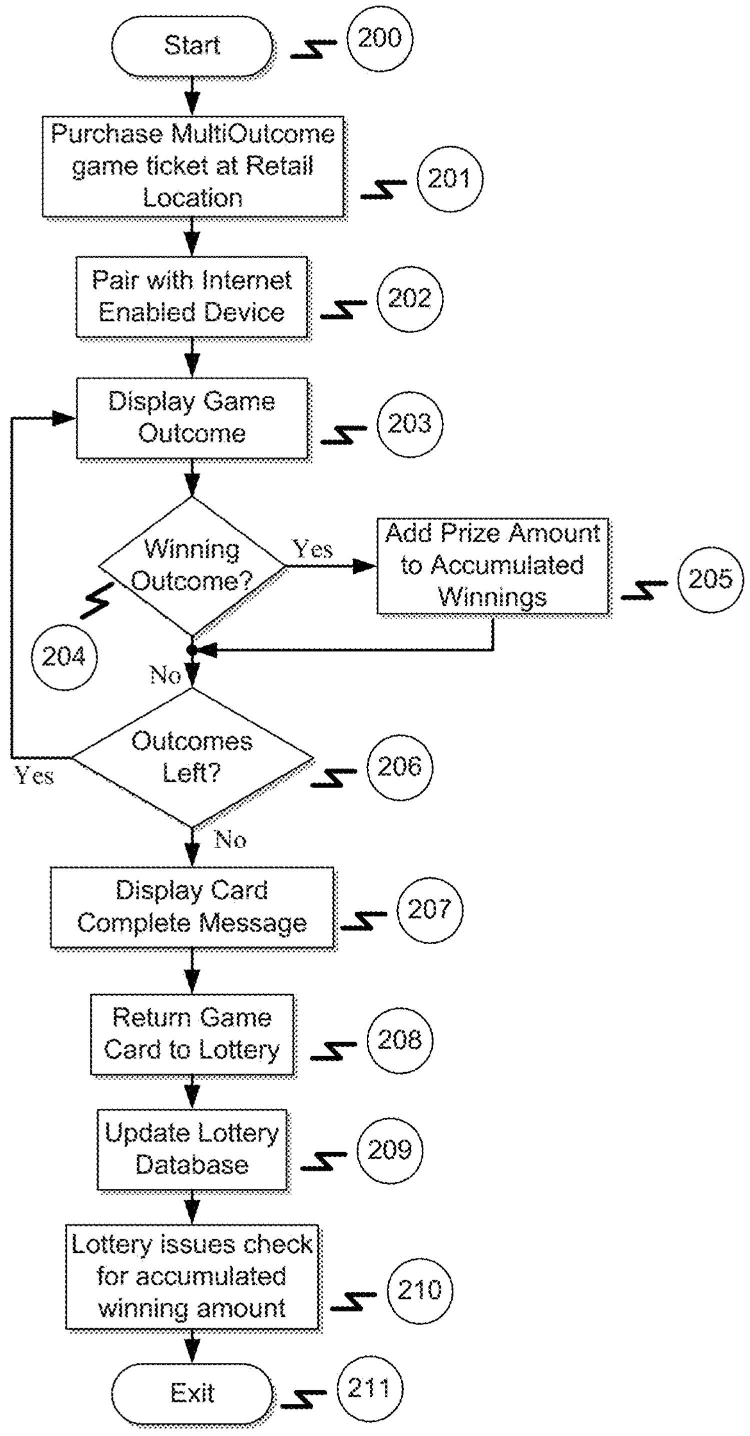
FIG. 5 depicts a flowchart of a predetermined multigame ticket system process according to an embodiment of the present invention.

FIG. 5 is a flow diagram representing a simplified overview of the life cycle for the multigame ticket. The flow diagram starts 200 after the 2D barcode has been created, the ticket has been printed, and the ticket has been distributed to an authorized retailer. The player visits the authorized retailer and in step 201 purchases the multigame ticket at the price documented in the game rules. In step 202 the player "pairs" or associates the ticket to their smart device by having the smart device read the information stored in the 2D barcode using a built in camera or other optical scanning device in the smart device. A separate optical scanning device connected (by wire or wirelessly) to the smart device may also be used if the smart device does not have optical scanning capabilities. The previously downloaded software application running on the smart device will decode the game outcome and create the game board for player interaction in step 203. If the software application is not downloaded yet, the player will be able to download the application using a link embedded in a barcode on the ticket. Once the player has concluded interaction with the game outcome (game is finished), the software application determines if the outcome is a winner based on the game specifications in step 204. If the outcome includes a winning combination, the software application branches to step 205 to add the prize amount to the accumulated winnings of the multigame ticket thus far. In step 206 the software application determines if there are game outcomes left to display. If there are, the program loops back to step 203. If all game outcomes have been displayed, the software application proceeds to step 207 and displays a "ticket complete" message. The next step 208 is for the player to return the multigame ticket (if there is one or more winning outcomes). Dependent on the game rules, the player may return the ticket to an authorized retailer, return the ticket directly to the main office, or redeem electronically (if permitted). Once the ticket has been returned, in step 209 the ticket information will be validated and the database will be updated to indicate the multigame ticket has been completed and retired. The final step 210 is for the player to receive the accumulated winning amount from the multigame. This could be in various forms such as but not limited to cash, check, or electronic transfer based on the game rules. The process completes in step 211.

FIG. 6 provides a game specification breakdown 250 for a sample game of Quick Poker. There will be a total of 10,800,000 game outcomes created for the game. The prize schedule 251 in FIG. 6 shows the individual prize counts for each monetary prize tier. From the total number of games and the tier level prize counts, the odds of each specific prize tier can be calculated. By example, there are just ten $500 tickets available. This defines the odds of the top tier prize level that wins $500 at 10/10,800,000 or 1 in 1,080,000.

As seen in FIG. 6, there are 10 possible winning outcomes. The 10 outcomes are "tokenized" (encoded) into a single 8-bit numeric value (byte). With just 10 of 256 possibilities used, there is an opportunity to add further winning possibilities to a game "hand". A nonlimiting example would be to add 1 wild card joker, allowing an odds change to the existing winning hands (tokens). There will only be 10 game outcomes with a value of $500 (Top Tier) for the sample game. This is also the case for the $250 prize tier.

Figure 7:
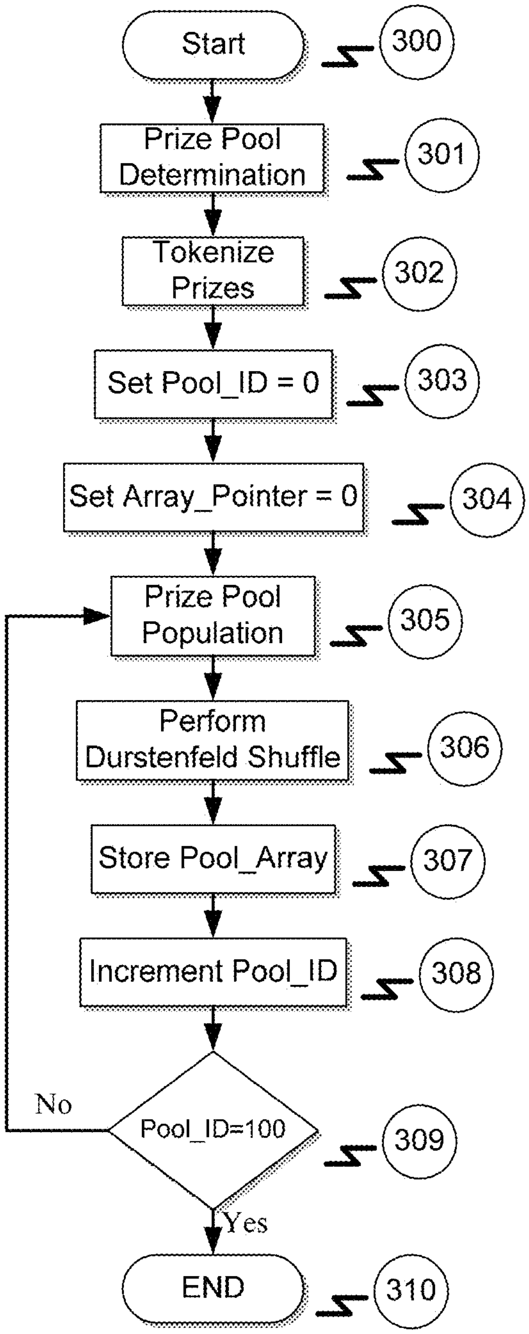
FIG. 7 depicts an overview flowchart of a prize pool population and shuffle according to an embodiment of the present invention.

FIG. 7 is a flowchart for the population and randomization of one hundred prize pool arrays. It should be noted this flowchart, as well as the following flowcharts, is based on the game specification example in FIG. 6 for the numbers used, and that aspect is not intended to be limiting. The function begins at "start" 300. The first step in the process is a software call to the prize_pool_determination function in step 301. A table is loaded into the database's memory which assigns a token number to each prize level in step 302.

Variables called Pool_ID and Array_Pointer are respectively initialized to zero in step 303, 304. The subfunction Prize Pool Population is called next in step 305. Once the prize pool array is populated with the appropriate prize tokens, another subfunction is called to perform a Durstenfeld Shuffle in step 306 to randomize the prize pool array. When the randomization is completed, the prize pool array is stored in step 307 into the main database. The variable Pool_ID is incremented by one in step 308. The variable is then checked to see if it is equal to one hundred in step 309, indicating if there are more prize pool arrays to populate and shuffle. If there are more arrays to populate, the method begins to populate the next array by returning to step 305, otherwise the method ends in step 310.

Figure 8:
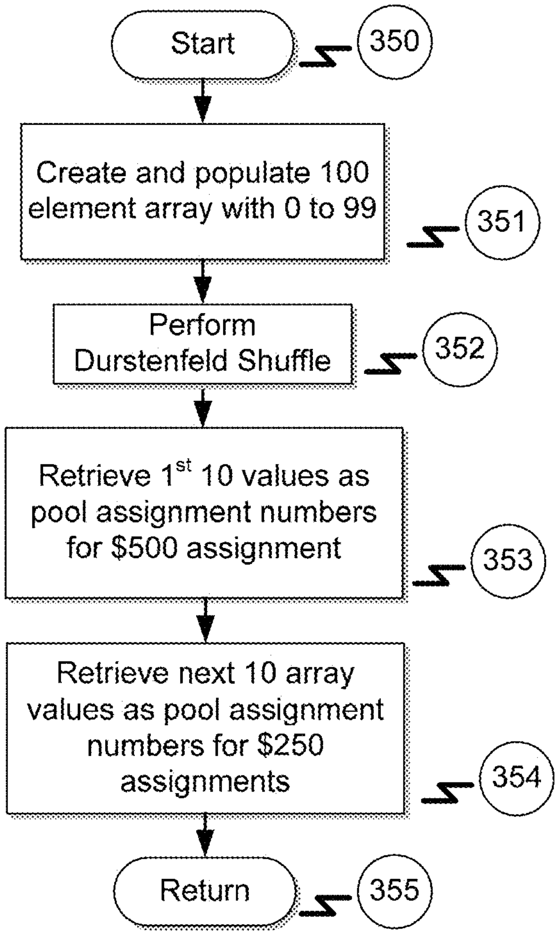
FIG. 8 depicts a flowchart of a prize pool determination according to an embodiment of the present invention.

FIG. 8 is a flowchart for the process used to determine which prize pools will contain the prizes, which are less than one per pool as defined in the game specifications. In this example, the prize determination method will determine which prize pool array will contain the token numbers for the $500 (token #9) and $250 (token #8) prizes. The function enters at start 350 and creates a temporary array of 100 elements and populates the positions with values between 0 to 99, representing the 100 prize pool arrays in step 351. The method next performs a Durstenfeld Shuffle in step 352 to randomize the values of the array. When the shuffle is completed, the first 10 array elements are retrieved in step 353 and will be used to indicate which prize pool will contain the token number for the prize of $500. The next ten elements are retrieved and will be used for the assignment of the $250 token numbers in step 354. In step 355, the method returns the values to the software calling routine.

Figure 9:
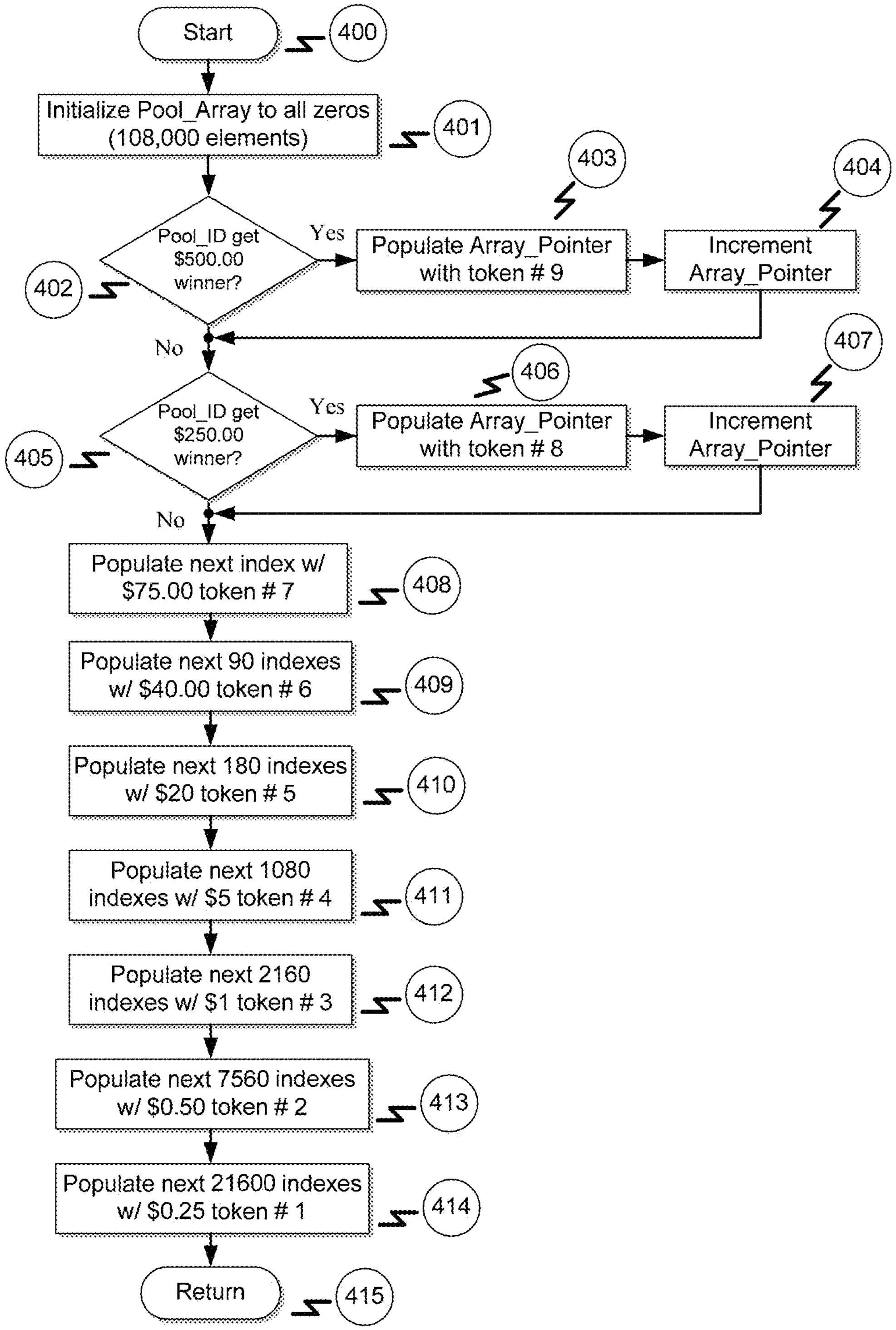
FIG. 9 depicts a flowchart of a prize pool population according to an embodiment of the present invention.

FIG. 9 is a flowchart for the process which populates each of the 100 prize pool arrays with the tokens for the prizes available to win. The process starts at step 400. The process then begins creating a pool_array with 108,000 elements all assigned to zero in step 401, which is the token number for a non-winning game outcome. The process then checks if the Pool_ID variable (which is passed from the calling array) indicates this is a pool array which receives the token for a $500 ticket in step 402. If yes, the method replaces the element in the pool array at the location of the array pointer with token #9 in step 403 before incrementing the array pointer in step 404. Next, the process checks to see if this pool_array will contain the token for a $250 winner in step 405. If yes, the method updates the current element to #8 in step 406 before incrementing the array pointer in step 407. As there is one $75 winner per prize pool, the process populates the next index with token #7 in step 408. Not shown is the process of incrementing the array_pointer by the number of indexes updated, in this case the pointer is incremented by one. The next 90 indexes are populated with token #6 for the $40 winners in step 409 and the array_pointer is incremented by 90 (also not shown). The process populates the next 180 indexes with token #5 in step 410, increments the array_pointer (not shown) before populating the following 1080 indexes with token #4 in step 411. The process continues the population of the specified number of indexes in steps 412, 413, and 414 of the array and incrementing of the array pointer (not shown) for each prize level. The remaining indexes in the pool_array have already been initialized to zero, which is the token number for non-winning game outcomes tickets. The method returns to the calling method in step 415.

Figure 10:
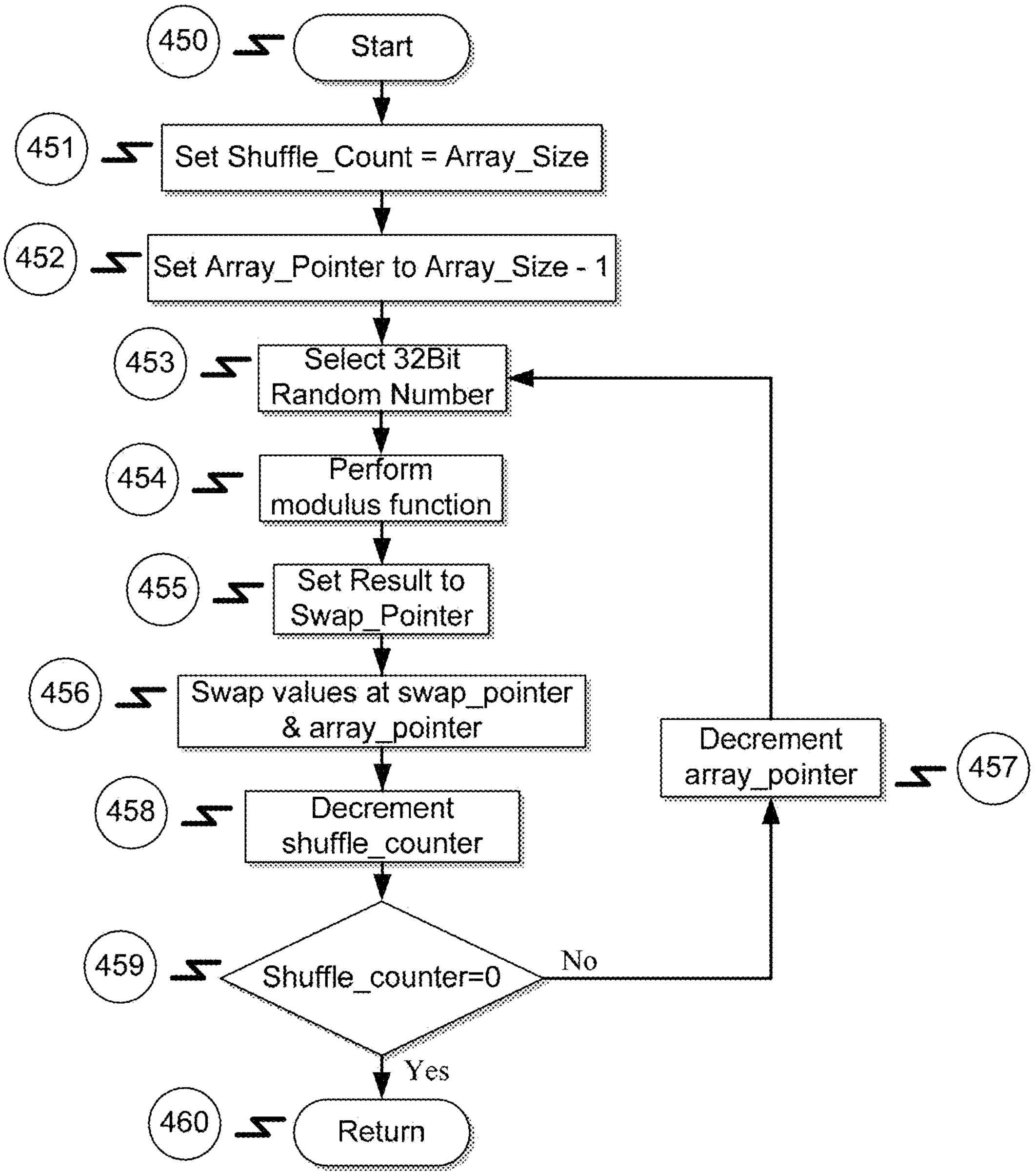
FIG. 10 depicts a flowchart of a Durstenfeld shuffle function according to an embodiment of the present invention.

FIG. 10 shows a process flowchart for the Durstenfeld Shuffle function used to randomize the various data arrays. The process enters the function through the "Start" block in step 450. Since numerous sequences of routines utilize this function, the Shuffle_Count variable must be set to equal the Array_Size in step 451 and the Array_Pointer variable is set to Array_Size-1 in step 452. Once a 32-Bit true random number is generated in step 453, a modulus function is performed in step 454 to ensure the random number generated is within the range of 0 to the Array_Pointer. The result of the modulus function is set to the Swap_Pointer in step 455 and the values in the array stored at Array_Pointer and Swap_Pointer are transposed in step 456. The variable shuffle_count is decremented by one in step 458 and checked to see if it is equal to zero in step 459. If shuffle_count is not equal to zero, there are more elements to shuffle so Array_Pointer is decremented by one in step 457 and the process repeats from the selection of the 32-bit number in step 453. Once shuffle_count equals zero, the shuffle of the array has been completed and the function can return to the calling routine in step 460.

There are many ways to shuffle data including but not limited to the Fisher and Yates' method, Durstenfeld shuffle, "inside-out" algorithm, and Sattolo's algorithm. However, the Durstenfeld shuffle is one of the most effective algorithms for shuffling. One of the advantages of performing a Durstenfeld shuffle is the speed at which it performs. It requires a decrementing pointer that reduces the size of the swap field. A random number generator is used to select a pair of swap pointers to perform a single swap. As the swap field is reduced, a modulus is applied to the random numbers. In order to achieve optimal shuffle results, a true random number (hardware) should be used and truncation bias must be accounted for when applying a modulus function to the random number outcome.

Figure 11:
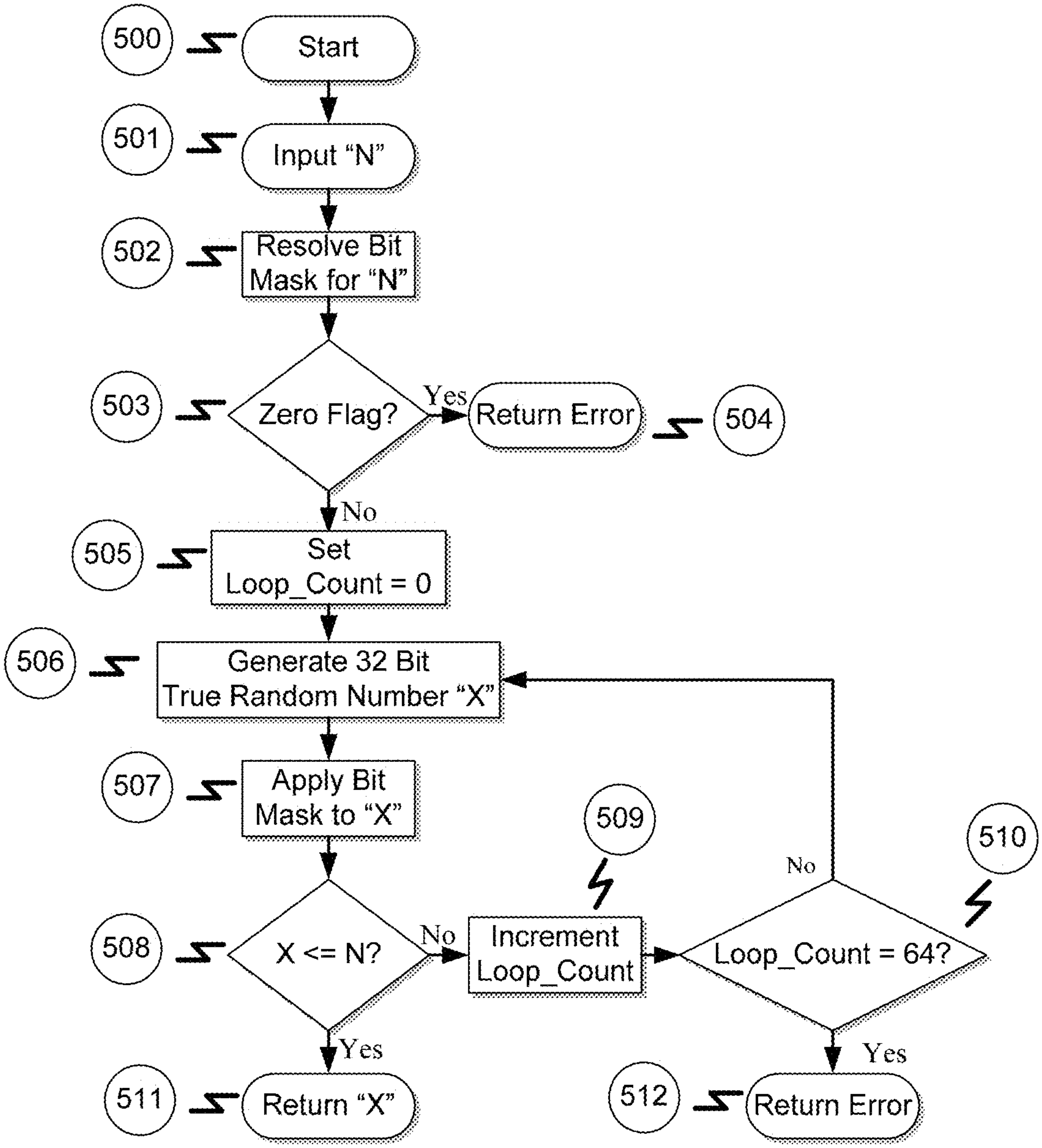
FIG. 11 depicts a flowchart of a true random number generator with modulus according to an embodiment of the present invention.

FIG. 11 is a flowchart for the process of generating a true random number between the values of 0 and "N". This flowchart produces the random numbers, which can later be "shuffled" into further random order utilizing the Durstenfeld Shuffle method. The term "true" indicates that some physical source of noise or random behavior is being measured and an unsigned 32-bit digital number is produced. Some examples of physical random sources are nuclear decay of a radioactive material, white noise voltages produced by a resistor at a specific temperature, randomly phased oscillators being sampled, or semiconductor "shot" noise. The key attribute of the various "noise" sources is that they are non-deterministic in terms of behavior and can only be described on a statistical basis. Usually the physical noise source is "whitened" using software to decorrelate sample values. By example, if left as an unsigned 32-bit integer, the random values would vary from 0 to 4,294,967,296.

When targeting specific probabilities, a modulus function is used to set the upper limit on the random outcome, by example 1 in 100. A modulus of 100 applied to the 32-bit raw random number value will produce a random value of 0-99. The modulus function is based on an arithmetic decision function generally expressed as: N/D, remainder R. By example, if N is 10 and D is 8, then R=2. For the purpose of random number generation, the modulus function introduces "truncation bias" which will affect the statistical outcome. The effect of truncation bias must be compensated for when producing a random integer value between 0 and "N".

The process starts in step 500. In step 501 the function of generating a 32-bit unsigned random number between a value of 0 to "N" starts, where N is an input variable defining the upper limit of the random number return. Step 502 determines an "ANDing" logical mask to be applied to the modulus "N" to correct for truncation bias, to be described further in FIG. 12. Step 503 traps an error whereby, the modulus is 0 and returns to the calling function at step 504.

Step 505 starts the process of requesting an unsigned 32-bit hardware generated random number. Step 506 executes a suitable function to access the true random number generator. Step 507 applies the truncation correction bit mask. Step 508 determines if the random number exceeds the modulus limit defined by the bit mask.

If the random number is within the limits of the bit mask, the value is returned at step 511. If the random number exceeds the bit mask limit, the loop_count is incremented in step 509 and the loop_count limit is checked in step 510. If loop_count is exceeded, then an error is declared in step 512, otherwise a new random number is selected by returning to step 506.

Figure 12:
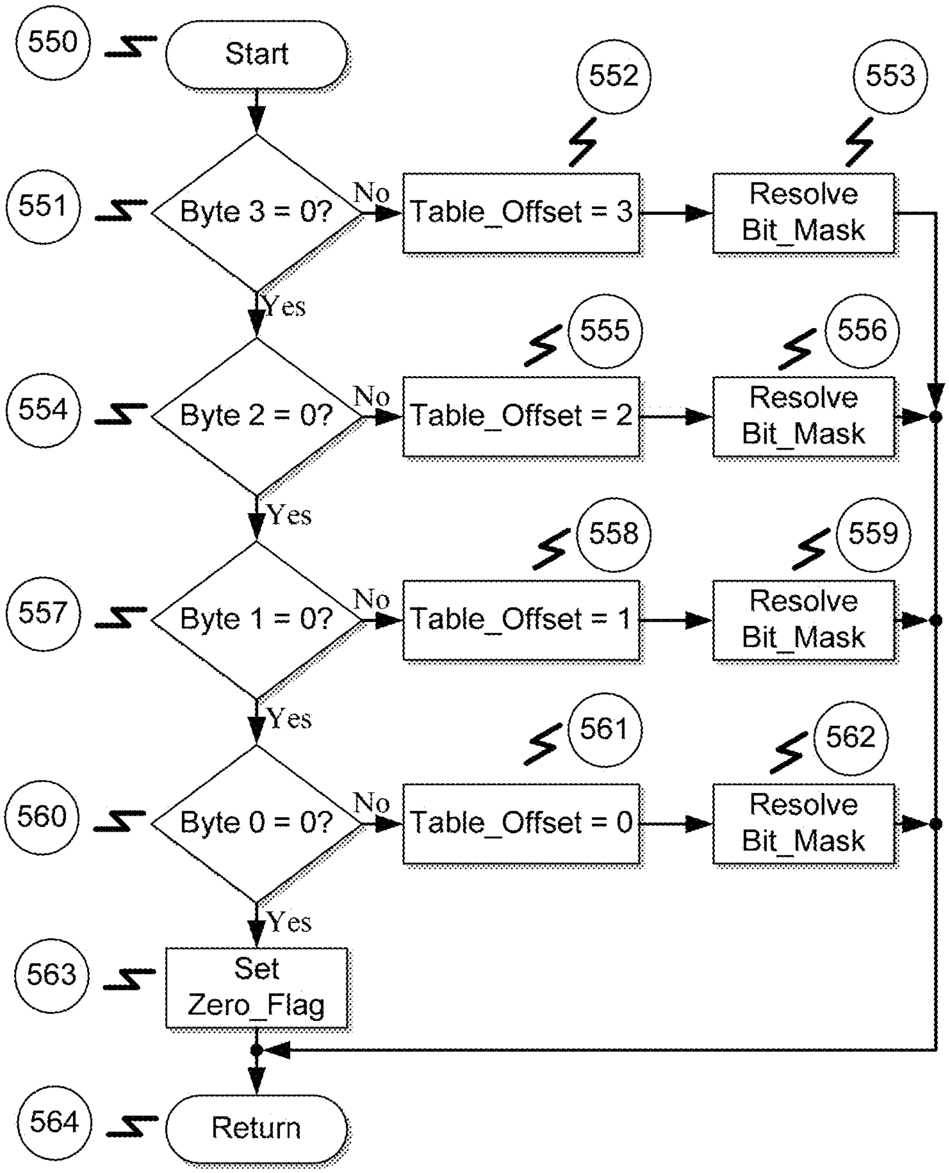
FIG. 12 depicts a flowchart of a modulus bit mask function according to an embodiment of the present invention.

FIG. 12 provides details on creating a modulus bit mask in flowchart form. The modulus value is in a 32-bit unsigned format, which can be broken into four 8-bit groups (bytes). Each byte of the modulus is checked for a non-zero value in steps 551, 554, 557, 560. If found, a bit mask will be resolved in respective steps 553, 556, 559, 562 and the function exits in step 564. If all four groups are set to 0, then the modulus is set to 0, which is an illegal value. If a 0 modulus is detected, an error flag is set (zero_flag) in step 563 and the function exits 564.

Figure 13:
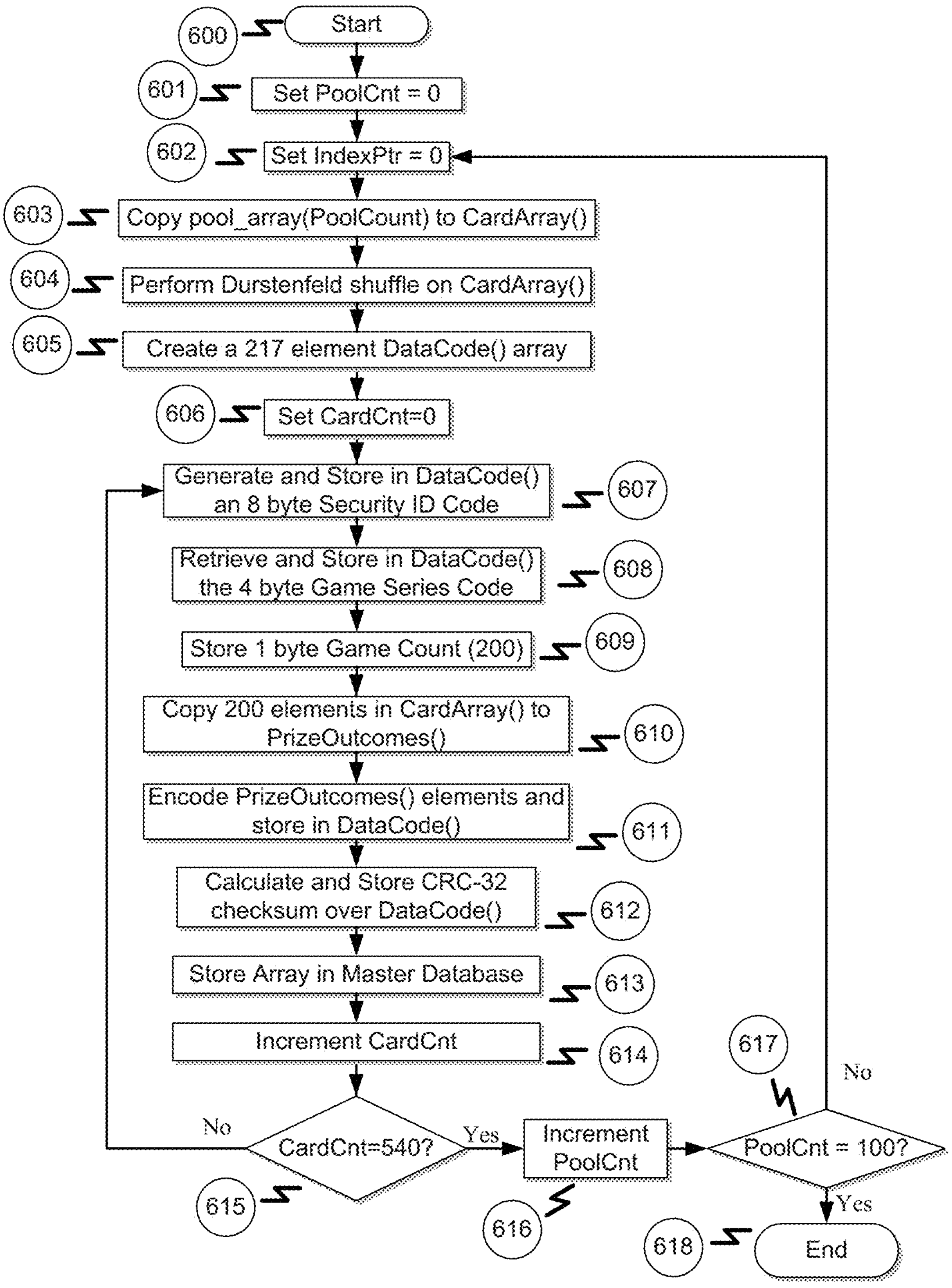
FIG. 13 depicts a flowchart of generating game batches according to an embodiment of the present invention.

FIG. 13 is a flowchart depicting the routine for creating the batches of encoded game outcomes to be used in the 2D barcodes. The routine enters at step 600. The variables PoolCnt and IndexPtr are initialized to zero in steps 601 and 602, respectively. The 108,000 byte Pool_Array(poolcount) is copied to a temporary array named CardArray in step 603. In step 604, a Durstenfeld shuffle is performed on CardArray. A temporary working array named DataCode with a size of 217 bytes is created and initialized in step 605. A local variable named CardCnt is initialized to zero at step 606. In step 607, the security identification code is generated. The 8 byte security identification code is stored in the DataCode array. The 4 byte game series code as defined in the game specification and rules is retrieved and stored in the array in step 608. Next, in step 609, the game count is stored in the DataCode array. In the current embodiment, the Game Count is set to a fixed 200 games, but in other embodiments the count could be variable or fixed to a different value. The game outcomes previously copied to the CardArray are copied to another temporary array named PrizeOutcomes in step 610 and encoded prior to being copied into the DataCode array in step 611. A 4 byte checksum to guarantee data integrity is calculated over the 213 bytes previously stored in the DataCode array and stored in the final 4 bytes of the DataCode array in step 612 (nonlimiting example is CRC-32 or more formally, Cyclic Redundancy Check Character). The full DataCode array is stored as a record in the master database file in step 613 for later retrieval for printing and verification purposes. The CardCnt variable is incremented by 1 in step 614 and compared to 540 in step 615. 540 is the number of barcodes created from each of the prize pools. Referring back to the table in FIG. 6, a prizepool contains 108,000 game outcomes and each barcode contains 200 outcomes. Therefore, 108,000/200=540. If CardCnt is less than 540, the program loops back to step 607, otherwise all outcomes in the current prize pool have been grouped. The program increments the PoolCnt variable in step 616 and checks to see if it is equal to 100 in step 617. If the count is not equal to 100, indicating there are more prize pools remaining, the program loops to step 602; otherwise, the program exits the routine at step 618.

The system and method for a multigame game ticket as described herein utilizes a security method and system defined by embodiments of the invention found in U.S. Pat. No. 8,870,084 ('084 patent), which is herein incorporated by reference in its entirety. The following is a summary of the '084 invention operating as a security system and method for a multigame game ticket and system.

Figure 14:
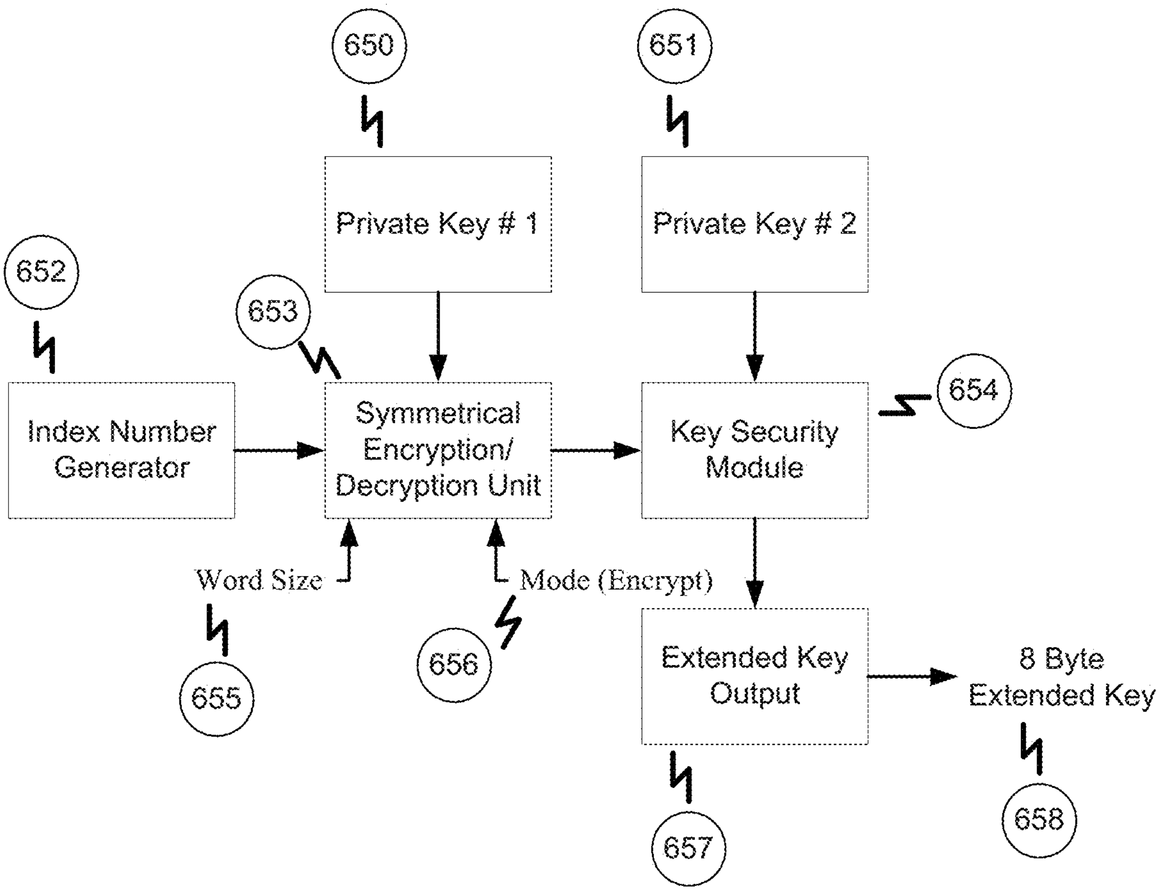
FIG. 14 depicts a flowchart of a security identification code generation system according to an embodiment of the present invention.
Figure 15:
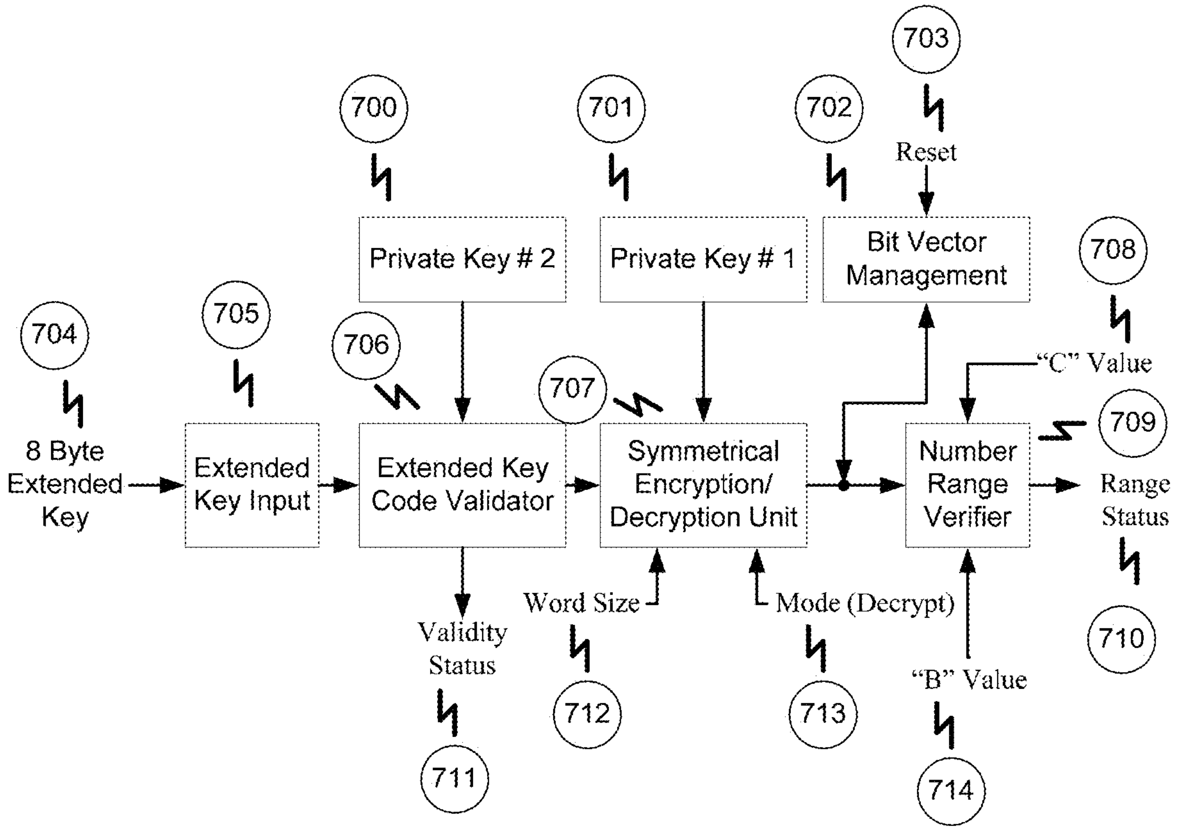
FIG. 15 depicts a flowchart of a security identification code validation system according to an embodiment of the present invention.

FIGS. 14 and 15 illustrate a security key generation and validation system according to the embodiment of the present invention. The security generation process includes the following: An index number generator 652 is connected to a symmetrical encryption/decryption unit 653. Private key #1 650 selects the index number security ordered pairs generated by the symmetrical encryption/decryption unit 653. Also, acting as control elements to the encryption/decryption unit are the word size control 655 and mode inputs 656. The word size control input defines the number of bits used as a digital word for both the input and output ports of the symmetrical encryption/decryption unit 653. The mode input 656 identifies the mode of operation as encryption. The input of the key security module 654 is connected to the output of the symmetrical encryption/decryption unit 653. Private key #2 651 controls the generation of a security code that is concatenated with the input of the key security module 654 and placed into the extended key output buffer 657. The output of extended key output 657 is an 8-byte extended key 658.

The security validation process starts with the contents of extended key output buffer 657 (e.g. the 8-byte extended key 704) being placed into the extended key input buffer 705. This is done by any means, such as a wired or wireless communications path, disk file, or human keyboard input, as nonlimiting examples. The contents of the extended key input buffer 705 act as an input to the extended key code validator 706. The extended key code validator 706 produces a validity status 711, indicating if the key is valid. The validity status of the extended key code validator 706 will indicate if the content of the extended key input buffer 705 were produced by a key generator whereby private key #2 651 matches that of private key #2 700. If the validity status is affirmative, a process sequencer (not shown) will proceed to convert the extended key to a number index value by way of the symmetrical encryption/decryption unit 707. The symmetrical encryption/decryption unit has two control inputs, word size 712 and mode 713. Word size 712 defines the number of bits that are operated upon. Mode 713 is a single bit control defining encryption or decryption mode. The operation and functionality of the symmetrical encryption/decryption unit 707 is identical to that of 653 except that the mode is set to decryption. If the validity status is negative, indicating the extended key was not generated by an authorized key generator as defined by this invention or not utilizing the same private key #2 651, 700, the process sequencer (not shown) will abort any further processing and take appropriate actions to indicate the invalidity of the processed contents of the extended key input buffer 705.

The output of the symmetrical encryption/decryption unit 707 is connected to both the input of a number range verifier 709 and a bit vector management process 702. The number range verification 709 generates a range status 710, which indicates whether the number is within an upper 708 and lower bound 714. The process sequencer may optionally use the index value output from the symmetrical encryption/decryption unit 707 to verify if a bit is set in a bit vector (not shown) located within the bit vector management process. If the process sequencer determines the bit is set, it would indicate that the key code in the extended key input buffer 705 had been processed at a previous time and should abort any further processing of the extended key as well to take appropriate actions to invalidate the extended key input. The number range verifier 709 will determine if the input of the number range verifier 709 is greater than or equal to the "B" input to the number range verifier 709 and less than or equal to the "C" value of the number range verifier 709. The range status 710 of the number range verifier 709 will provide a binary status if the input is within the range of values "B" and "C". The bit vector management process 702 will set a bit within a bit vector (not shown) as specified by the index value output from the symmetrical encryption/decryption unit 707. Setting the bit within the bit vector indicates that the extended key was valid and has been processed.

Symmetric, secret-key, and block encryption/decryption methods (symmetric-key) are defined as a class of algorithms for cryptography that use identical cryptographic keys for both encryption of plaintext and decryption of ciphertext. In practice, the keys represent a shared secret. Other terms for symmetric-key encryption are secret-key, single-key, shared-key, one-key, and private-key encryption.

Symmetric-key cryptography transforms (scrambles) a message into something resembling random noise. The key determines the precise transformation. Mathematically, a cryptographic algorithm is a function that maps a message onto a ciphertext (an encrypted message). By using keys, it is possible to encrypt many different messages using one particular cryptographic algorithm with a different outcome for each key.

Some cryptographic algorithms that operate on fixed word lengths are referred to as block ciphers. Block (word) sizes of 32, 64, and 256 bits are commonly used. Some nonlimiting examples of popular and well-respected symmetric encryption/decryption algorithms are Twofish, Serpent, AES (Rijndael), Blowfish, CAST5, RC4, DES, Triple-DES, and IDEA.

Figure 16:
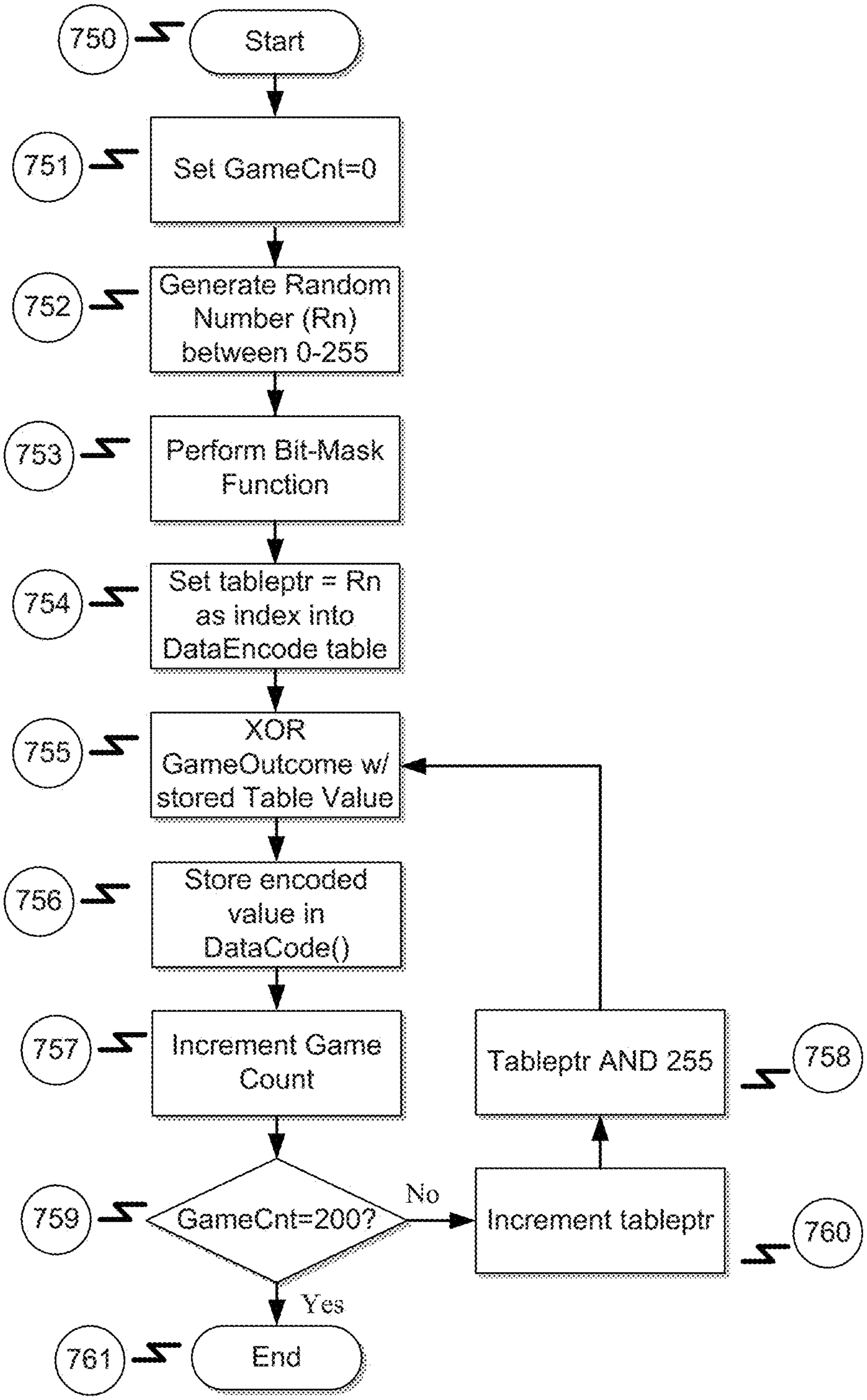
FIG. 16 depicts a flowchart of a game outcome encoding function according to an embodiment of the present invention.

FIG. 16 is a flowchart for the routine which encodes the game outcome tokens stored in the prize pool arrays. The routine enters at 750. The variable GameCnt is initialized to zero in step 751. In step 752 a random number between 0-255 is generated. The bit mask modulus function is called in step 753 to eliminate truncation bias. The random number is assigned to the variable tableptr in step 754 as the index into a 256 byte table stored in memory. The value stored in the table at tableptr is retrieved and exclusive ORed with the value at location GameCnt in the PrizeOutcomes array in step 755. The encoded value is stored in the DataCode array in step 756. The process of "exclusive ORing" obscures the value of the tokenized predetermined game outcomes with random data. This is equivalent to adding an opaque "scratch off" layer to a conventional scratch off game ticket. To retrieve the original token value, the "obscured" taken value is exclusive ORed again with the same random value. The variable GameCnt is incremented in step 757 and compared to 200 in step 759. 200 is the number of game outcomes that are being encoded for the barcode. If the variable equals 200, indicating all game outcomes have encoded, the routine ends and returns to the calling program in step 761. If the variable does not equal 200, tableptr is incremented in step 760. The variable is then AND'd with 255, producing a value between 0-255, in step 758, before looping back to step 755.

The outcome token encoding process described above and in FIG. 16 provides a randomizing process to obscure the actual token values. It should be noted that at step 752 a software based random number is used. A nonlimiting example is the linear congruential random number generator: 13*X+1. This simple random number generator when restricted to 8 bit unsigned numbers will appear to produce random number values between 0 and 255. No two numbers will be repeated until the cycle starts over. When the game parameters are downloaded from the host during the card installation process a "seed" 8 bit value is identified as a starting value for the software based random number generator. Downloading the random number seeds for each game outcome occurs at step 856 in FIG. 18, to be describe in further detail below.

FIGS. 17(*a*)-(*d*) represent an example of the rules associated with a predetermined multigame ticket game 800. The rules indicated the name of the associated game and a game ID number along with the cost to purchase a multigame ticket from an authorized retailer. The play symbols which may appear in the "Game Board" area (FIG. 19, element 905) are defined. Also defined are the available prizes that can be won on a multigame ticket and the total number of game outcomes that will be produced for this game.

How and which prize a player wins is defined next in the rules. There is a table included in the rules that shows in more detail the prizes available to win, the odds of winning each prize and the number of outcomes produced for each of the prizes.

Some lotteries may offer retailer incentive awards and bonuses for selling lottery tickets, specifically winning lottery tickets. If so, the details of these awards and bonuses will be described in the game rules. There is also a disclaimer indicating the time frame to redeem a winning scratch off ticket, which laws will be in effect for this game (this is typically the state where the lottery office is located), and how the player may redeem their winning scratch off tickets.

There is a disclaimer that the main office may announce a termination date which would end the sale of this game's scratch off tickets. A termination date may be announced for several reasons such as a predetermined date or all top prize tickets have been redeemed.

Figure 18:
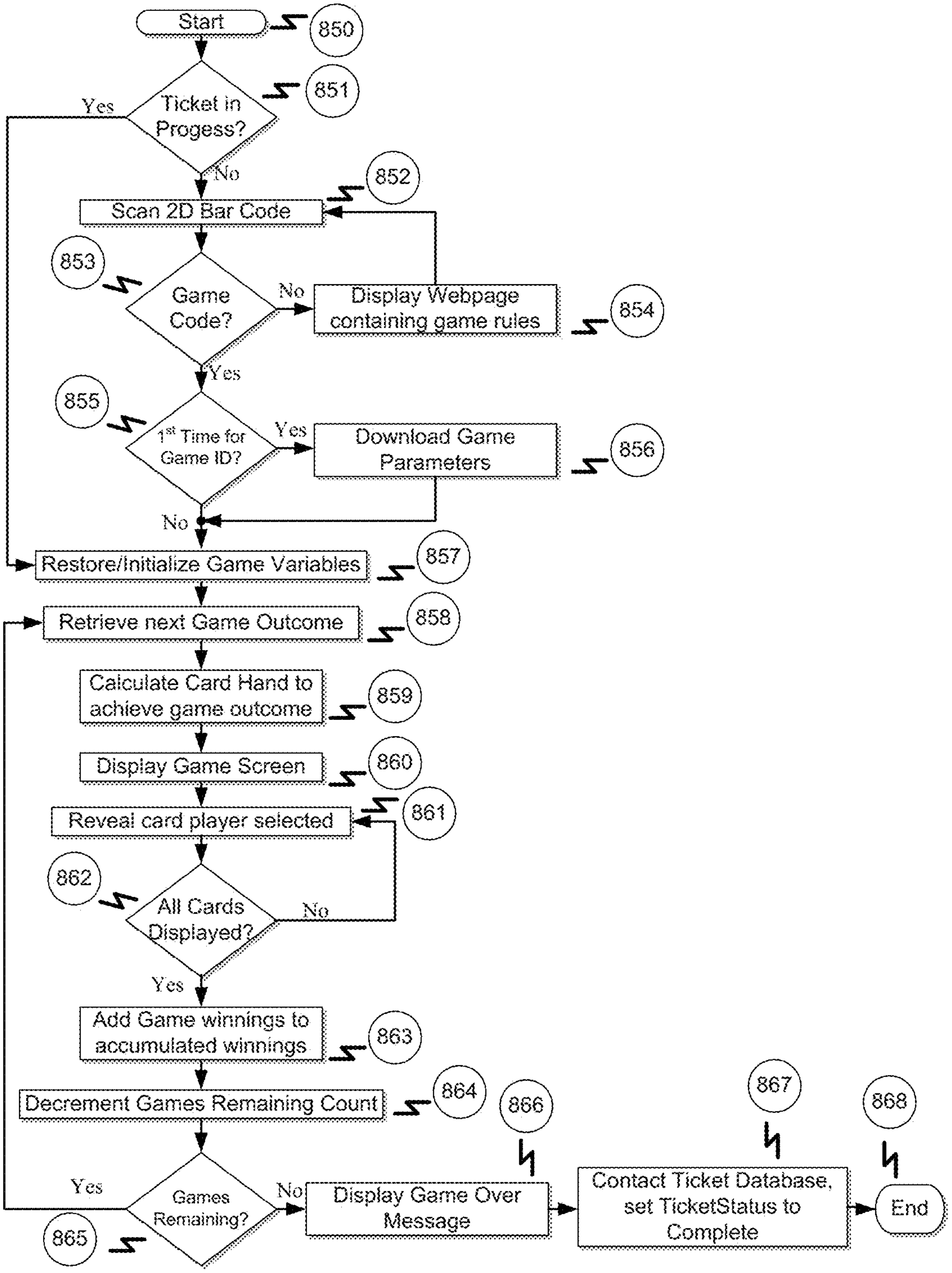
FIG. 18 depicts a flowchart of a smart device application according to an embodiment of the present invention.

FIG. 18 is a top level flowchart of the application for a smart device. The program begins at step 850 and checks to see if there are game outcomes left from a previously scanned ticket in step 851. If there is a game in progress, the program skips forward to step 857. Otherwise the program waits for the player to "scan" the barcode with the camera or other optical scanner at step 852. The program decodes the information stored in the 2D barcode in step 853 to determine if the barcode contains game information. If it is not game information, the program displays the URL link to the game rules for the player to read in step 854 before looping to step 852.

If the barcode did contain game information in step 855 the software application determines, based on the game series code, if this is the first time this game variation has been accessed on this device. If yes, the software application branches off to the routine to download game information for the applicable online resource in step 856, before returning. In step 857, the software application restores (if a previous game was in progress) or initializes (if a new ticket) the various game variables. The software application then retrieves and decodes the next (or first) game outcome to be displayed in step 858. Based on the game outcome and game information downloaded, the software application in step 859 calculates the appropriate card hand to display to achieve the proper game outcome. The software application then displays the game screen in step 860, with all cards "turned face down". The software application waits for the player to select a card to display (not shown) before revealing the selected card in step 861. If all cards have not been displayed in step 862, the software application loops back to step 861. Otherwise the software application continues to step 863 and adds the winning amount for the hand, if any, to the accumulated winnings thus far earned for the ticket. The games remaining count is decremented in step 864 and the software application determines if there are any remaining counts at step 865. If yes, the program waits for the player to initiate a new hand (not shown) before looping back to step 858, otherwise it continues to step 866 and displays a game over message. The software application then connects via the internet to the ticket database to change the status of the ticket to complete in step 867. The program ends at step 868.

Figure 19:
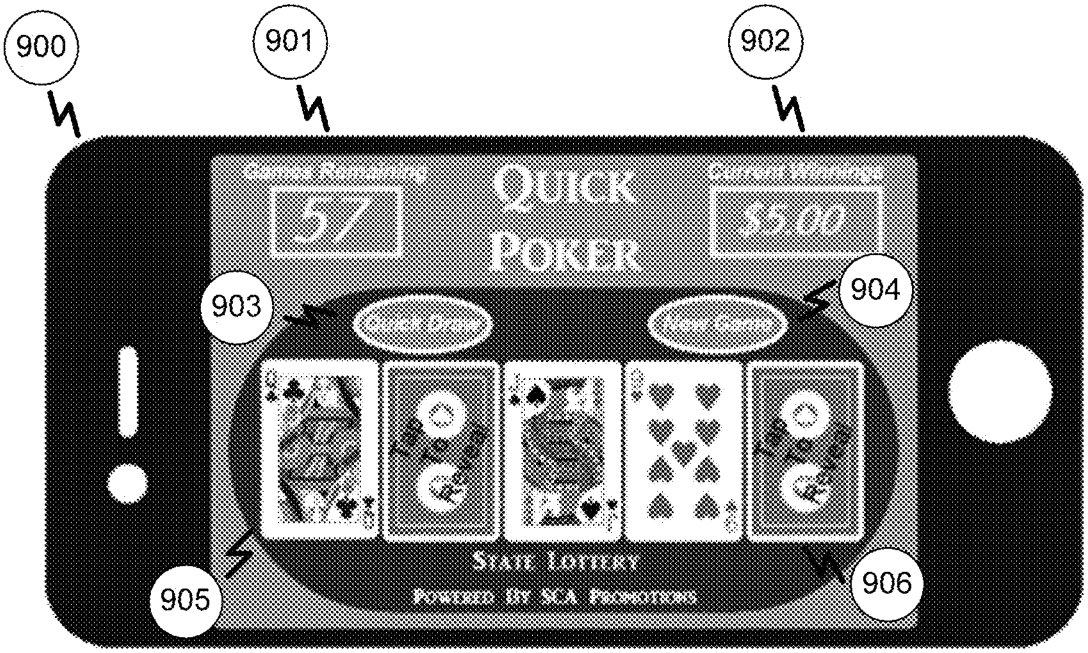
FIG. 19 depicts an example of a screenshot of a quick poker hand in progress on a smart device according to an embodiment of the present invention.

FIG. 19 is a pictorial representation of an implementation of a nonlimiting game. The display on the smart device 900 shows the game screen. On the game screen is the play board 905 which contains the 5 individual game cards 906. When the game begins, all 5 cards are "face down" and are turned face up as the player taps the individual cards. Also located on the play board is the "quick draw" virtual button 903. This can be used by the player to quickly reveal all the remaining cards in the hand. Once all 5 cards are revealed, the player selects the "new game" virtual button 904 to display the next hand. The games remaining count 901 is displayed to indicate to the player how many hands are left to display, also displayed in the accumulated winnings of the ticket 902. These values are automatically updated when each hand is finished.

Figure 20:
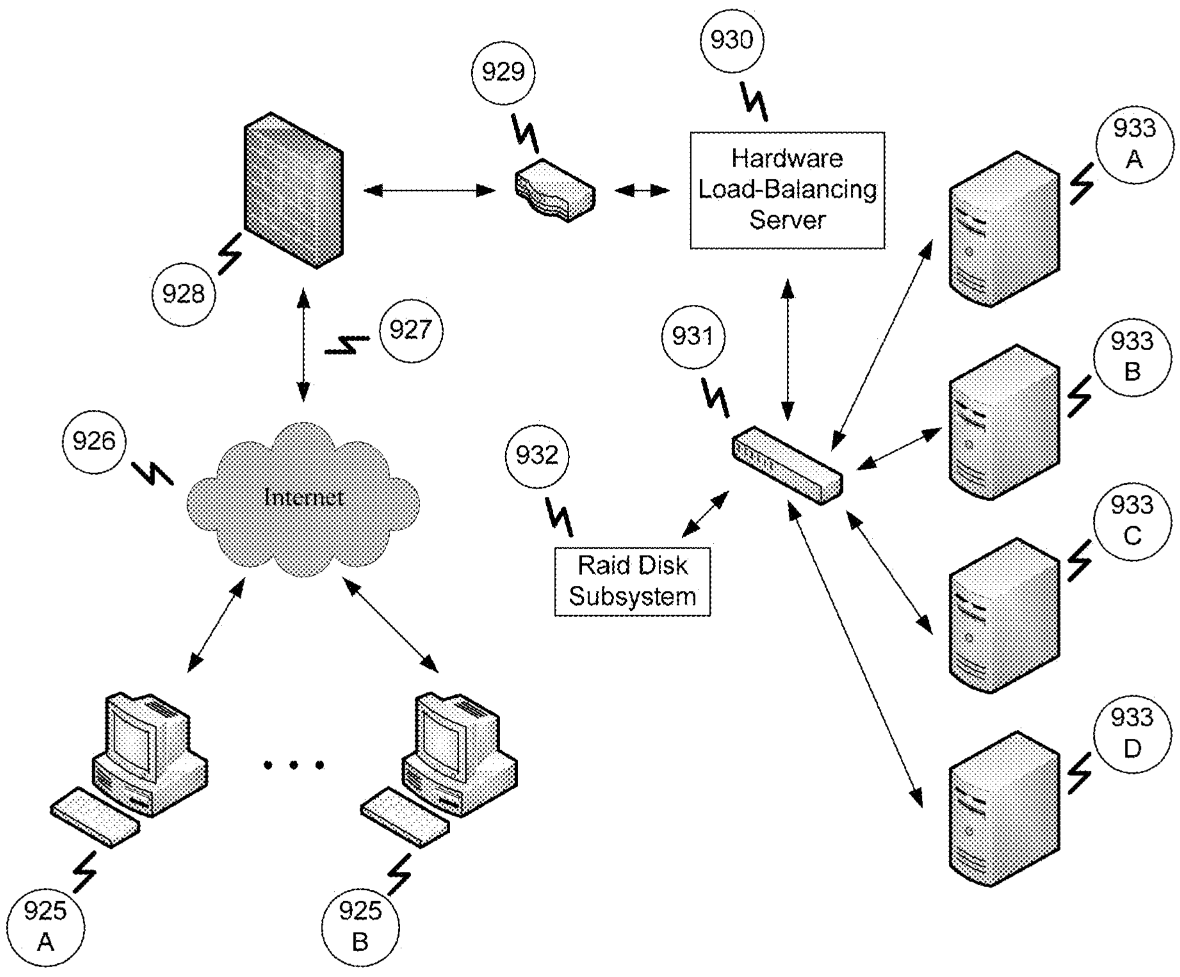
FIG. 20 depicts an example of a server farm according to an embodiment of the present invention.

FIG. 20 depicts an example of a server farm associated with the main office 51. The server farm is illustrated simply for exemplary purposes and is not intended to be limiting. The server farm includes any number of web devices 1 through N, illustrated here as web device 925A and web device 925B. The web devices are connected via the internet 926 to a hardware load-balancing server 930 through a router 929, firewall 928, and TCP/IP 927. The hardware load-balancing server 930 and a raid disk subsystem 932 are connected to any number of webserver computers, illustrated here as computers 933A-D, via a LAN switch 931.

Figure 21:
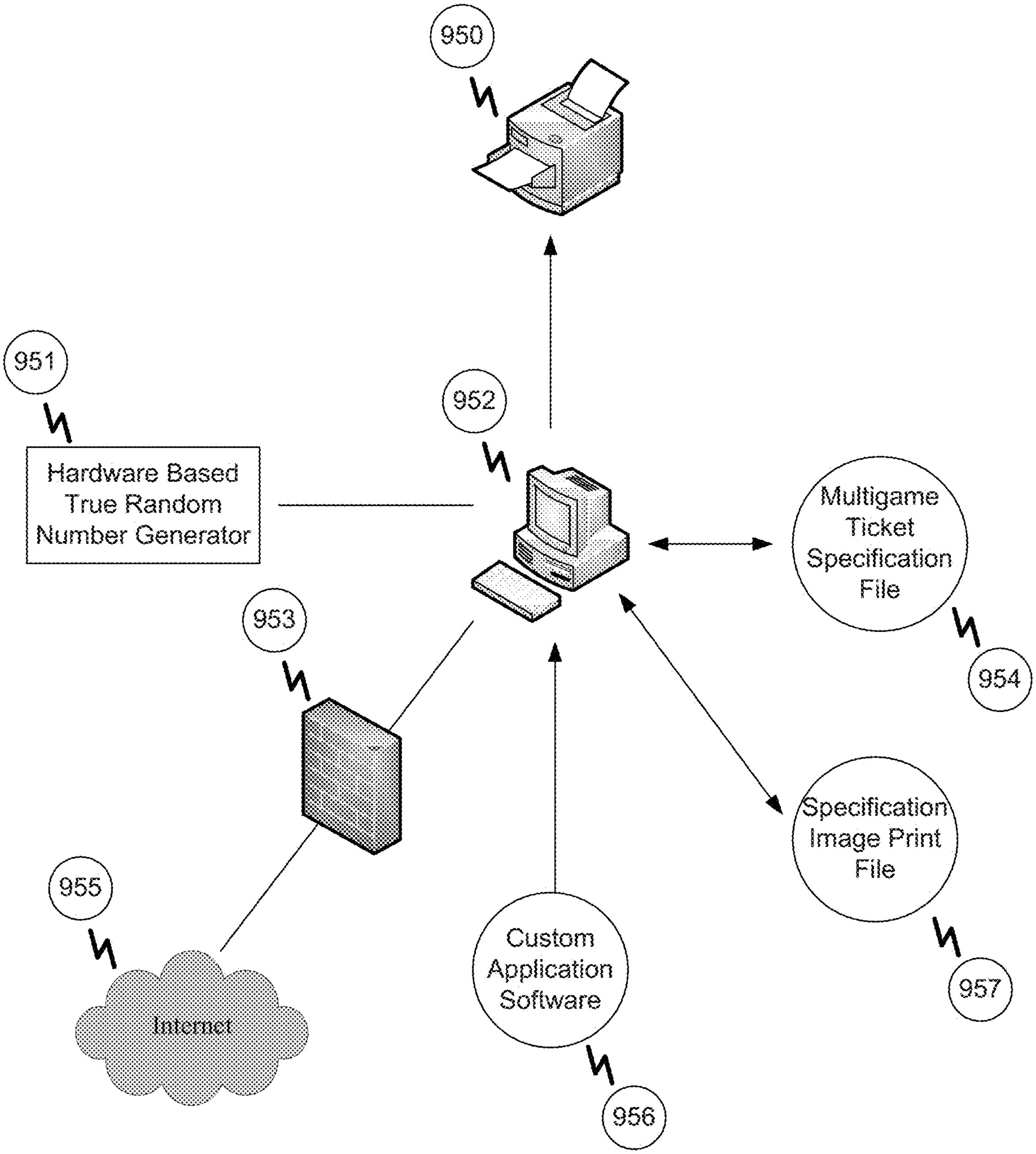
FIG. 21 depicts an example of a specification computer system according to an embodiment of the present invention.

FIG. 21 depicts an example of a specification computer system associated with the game file specification 50. The specification computer system is illustrated simply for exemplary purposes and is not intended to be limiting. A computing system 952 is connected to the Internet 955 through a firewall 953 and is also connected to a printer 950. The computing system 952 includes a hardware based true random number generator 951, as well as a multigame ticket specification file 954, a specification image print file 957, and custom application software 956.

Figure 22:
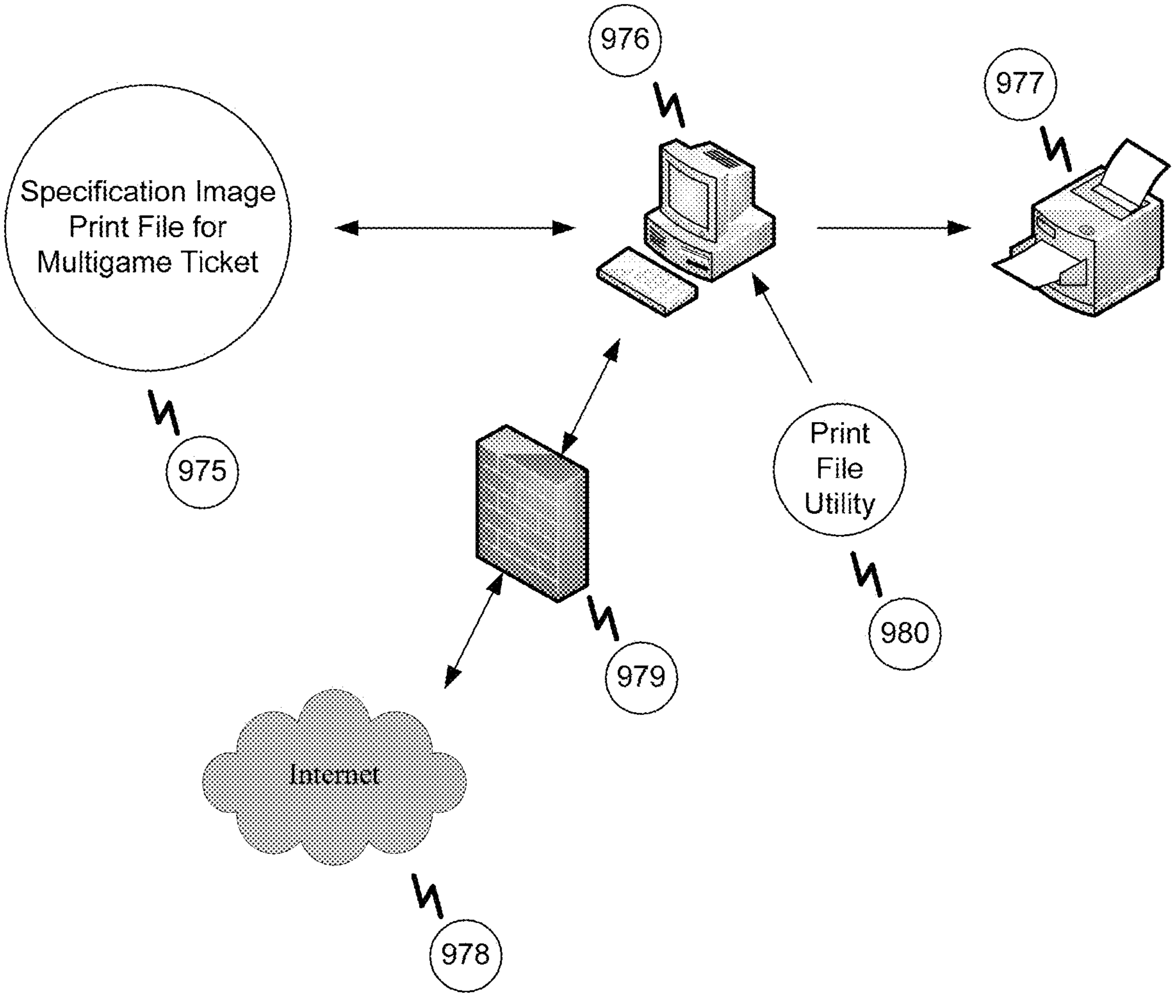
FIG. 22 depicts an example of a printing computer subsystem according to an embodiment of the present invention.

FIG. 22 depicts an example of a printing computer subsystem associated with the printing facility 53. The printing computer subsystem is illustrated simply for exemplary purposes and is not intended to be limiting. A computing system 976 is connected to the Internet 978 through a firewall 979 and is also connected to a standard high resolution printer 977. The computing system 976 includes a print file utility 980 for receipt of a specification image print file for multigame ticket 975 printing.

As such, generally disclosed herein are embodiments for a gaming system and method for generating and playing multigame tickets. The tickets encode the predetermined game outcomes in a multidimensional barcode. The player scans the barcode on their smart device and plays the encoded multigames using an internet downloaded software application program.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A system for implementing a predetermined multigame, comprising:

a plurality of tickets each having at least three multidimensional barcodes wherein the at least three multidimensional barcodes comprising: a first multidimension barcode containing an encoded plurality of predetermined game outcomes and information about game security and game data integrity, a second multidimension barcode containing a link allowing a player to download a software application to display outcomes associated with the predetermined multigame ticket, and a third multidimension barcode containing a link allowing the player to view a game specification and game rules, the at least three multidimensional barcodes configured to be optically scanned to have a result displayed by a computing device to allow the player to determine whether the encoded plurality of predetermined game outcomes comprise a winning outcome.

2. The system of claim 1, wherein the data integrity information comprises a 32-bit cyclic redundancy check character (CRCC).

3. The system of claim 1, wherein the encoded plurality of predetermined game outcomes are generated by a computer system programmed based on a game specification file and a random number generator to generate and shuffle a total plurality of predetermined game outcomes for the predetermined multigame.

4. The system of claim 3, wherein the total plurality of game outcomes are shuffled via the random number generator based on a Durstenfeld shuffle.

5. The system of claim 3, wherein the computer system is further programmed to apply a modulus bit mask to account for truncation bias in the shuffling of the total plurality of game outcomes.

6. The system of claim 1, wherein the encoded plurality of predetermined game outcomes are each tokenized into a finite word length digital representation.

7. The system of claim 6, wherein the tokenized predetermined game outcomes are each obscured by exclusive ORing with a random number, each random number having the same finite word length as each corresponding game outcome token.

8. The system of claim 1, wherein the information about game security identification incorporates a private security key generation and validation process.

9. The system of claim 1, wherein the information about game security identification comprises a private security key that is generated and validated using a symmetric-key process.

10. A method for implementing a predetermined multigame, comprising:

generating a total plurality of predetermined game outcomes for the predetermined multigame via a game specification file of a computer system and shuffling the total plurality of game outcomes for the predetermined multigame via a random number generator of the computer system; and causing each of a plurality of predetermined multigame tickets to be produced with at least three multidimensional barcodes comprising: a first multidimension barcode containing an encoded plurality of predetermined game outcomes of the total plurality of predetermined game outcomes and information about game security identification and game data integrity, a second multidimension barcode containing a link allowing a player to download a software application to display outcomes associated with the predetermined multigame ticket, and a third multidimension barcode containing a link allowing the player to view a game specification and game rules, the at least three multidimensional barcodes configured to be optically scanned to have a result displayed by a computing device to allow the player to determine whether the encoded plurality of predetermined game outcomes comprise a winning outcome.

11. The method of claim 10, wherein the information about game data integrity is a 32-bit cyclic redundancy check character (CRCC).

12. The method of claim 10, wherein shuffling the total plurality of game outcomes further comprises performing a Durstenfeld shuffle.

13. The method of claim 10, wherein shuffling the total plurality of game outcomes further comprises applying a modulus bit mask to account for truncation bias.

14. The method of claim 10, further comprising tokenizing each of the encoded plurality of predetermined game outcomes into a finite word length digital representation.

15. The method of claim 14, further comprising obscuring each of the tokenized predetermined game outcomes by exclusive ORing with a random number, each random number having the same finite word length as each corresponding game outcome token.

16. The method of claim 10, wherein the information about security identification incorporates a private security key generation and validation process.

17. The method of claim 10, wherein the information about security identification comprises a private security key that is generated and validated using a symmetric-key process.

18. A non-transitory computer-readable medium having stored thereon a computer program for execution by a processor configured to perform a method for implementing a predetermined multigame, the method comprising:

generating a total plurality of predetermined game outcomes for the predetermined multigame via a game specification file of a computer system and shuffling the total plurality of game outcomes for the predetermined multigame via a random number generator of the computer system; and causing each of a plurality of predetermined multigame tickets to be produced with at least three multidimensional barcodes comprising: a first multidimension barcode containing an encoded plurality of predetermined game outcomes of the total plurality of predetermined game outcomes and information about game security identification and game data integrity, a second multidimension barcode containing a link allowing a player to download a software application to display outcomes associated with the predetermined multigame ticket, and a third multidimension barcode containing a link allowing the player to view a game specification and game rules, the at least three multidimensional barcodes configured to be optically scanned to have a result displayed by a computing device to allow the player to determine whether the encoded plurality of predetermined game outcomes comprise a winning outcome.

19. The non-transitory computer-readable medium of claim 18, wherein the information about game data integrity is a 32-bit cyclic redundancy check character (CRCC).

20. The non-transitory computer-readable medium of claim 18, wherein shuffling the total plurality of game outcomes further comprises performing a Durstenfeld shuffle.

21. The non-transitory computer-readable medium of claim 18, wherein shuffling the total plurality of game outcomes further comprises applying a modulus bit mask to account for truncation bias.

22. The non-transitory computer-readable medium of claim 18, wherein the method further comprises tokenizing each of the encoded plurality of predetermined game outcomes into a finite word length digital representation.

23. The non-transitory computer-readable medium of claim 22, wherein the method further comprises obscuring each of the tokenized predetermined game outcomes by exclusive ORing with a random number, each random number having the same finite word length as each corresponding game outcome token.

24. The non-transitory computer-readable medium of claim 18, wherein the information about security identification incorporates a private security key generation and validation process.

25. The non-transitory computer-readable medium of claim 18, wherein the information about security identification comprises a private security key that is generated and validated using a symmetric-key process.

* * * * *